US007079769B1

(12) United States Patent
Tsukitani et al.

(10) Patent No.: US 7,079,769 B1
(45) Date of Patent: Jul. 18, 2006

(54) DISPERSION-COMPENSATING SYSTEM

(75) Inventors: Masa Tsukitani, Yokohama (JP);
Eisuke Sasaoka, Yokohama (JP);
Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 869 days.

(21) Appl. No.: 09/619,395

(22) Filed: Jul. 19, 2000

(30) Foreign Application Priority Data

Jul. 19, 1999 (JP) ............................... P11-205006
Dec. 2, 1999 (JP) ............................... P11-343479

(51) Int. Cl.
*G02B 6/00* (2006.01)
*H04J 14/02* (2006.01)

(52) U.S. Cl. ..................... 398/81; 385/141; 385/142; 385/127; 398/79

(58) Field of Classification Search ................. 385/24, 385/37, 27, 14, 31, 123–128, 141–145, 147; 398/79, 81
See application file for complete search history.

(56) References Cited

U.S. PATENT DOCUMENTS 6,417,945 B1 * 7/2002 Ishikawa et al. ............... 398/79
6,611,637 B1 * 8/2003 Okuno et al. ................. 385/24
6,681,082 B1 * 1/2004 Tanaka et al. ............... 398/158

FOREIGN PATENT DOCUMENTS

| JP | 7-107069 | 4/1995 |
|----|----------|--------|
| JP | 8-234255 | 9/1996 |
| JP | 9-23187 | 1/1997 |
| JP | 9-326759 | 12/1997 |
| JP | 10-170752 | 6/1998 |
| JP | 10-242943 | 9/1998 |
| JP | 10-276172 | 10/1998 |
| JP | 11-121840 | 4/1999 |
| JP | 2000-299660 | 10/2000 |
| WO | WO 99/30445 | 6/1999 |

OTHER PUBLICATIONS

"Crosstalk Bandwidth in Backward Pumped Fiber Raman Amplifier", J.S. Wey et al., IEEE Photonics Technology Letters, vol. 11, No. 11, Nov. 1999, pp. 1417-1419.

(Continued)

*Primary Examiner*—Michelle Connelly-Cushwa
*Assistant Examiner*—Kevin S. Wood
(74) *Attorney, Agent, or Firm*—McDermott Will & Emery LLP

(57) ABSTRACT

In the dispersion-compensating system of the present invention, a demultiplexer demultiplexes optical signals in a signal wavelength band of 1520 nm to 1620 nm propagating through a first common transmission line into C band (1520 nm to 1565 nm) and L band (1565 nm to 1620 nm). Then, the demultiplexer outputs the optical signals of C band into a first branched transmission line and the optical signals of L band into a second branched transmission line. A first dispersion-compensating device is provided on the first common transmission line and compensates for the dispersion in C and L bands. A second dispersion-compensating device is provided on the second branched transmission line and compensates for the dispersion in L band, which has not fully been compensated for by the first dispersion-compensating device. Hence, the dispersion of optical transmission line can fully be reduced in a wide signal light wavelength band.

23 Claims, 17 Drawing Sheets

OTHER PUBLICATIONS

"Fiber-laser probe for near-field scanning microscopy", S. G. Grubb et al., OFC '94 Technical Digest, pp. 136-137.

"Reduced dispersion slope, non-zero dispersion fiber", D. W. Peckham et al., ECOC '98, Sep. 20-24, 1998, pp. 139-140.

"765 Gb/s over 2,000 km Transmission Using C- and C-Band Erbium Doped Fiber Amplifiers", M.X. Ma et al., PD16-1-3.

"Triple-wavelength-band WDM transmission over cascaded dispersion-shifted fibers", J. Kani et al., WC2-1-4, pp. 26-29.

* cited by examiner

DISPERSION-COMPENSATING SYSTEM

BACKGROUND OF THE INVENTION

1. Field of the Invention

The present invention relates to a dispersion-compensating system which compensates for dispersion in a wide signal wavelength band.

2. Related Background Art

An optical transmission system employing a WDM (Wavelength Division Multiplexing) scheme transmits a multitude of wavelengths of optical signals in a 1.55-µm wavelength band by way of an optical fiber transmission line network and can carry out large-capacity, high-speed communications. This optical transmission system comprises not only an optical fiber transmission line which is a transmission medium for the optical signals, but also an optical amplifier for collectively amplifying the multitude of wavelengths of optical signals, and the like. In order to enable further larger-capacity/higher-speed communications in such WDM communications, various kinds of research and development have been under way.

As for the optical transmission line, reducing its dispersion and dispersion slope has been an important subject for study. Namely, if the optical transmission line has a dispersion in the wavelength band of optical signals, then their waveforms may be deformed to cause reception degradation when they reach a receiving station by way of the optical transmission line after being sent out from a transmitting station, since each optical signal has a certain bandwidth even though it is considered monochromatic. Therefore, it is desirable that the dispersion of optical transmission line be as small as possible in the signal wavelength band. Also, for larger-capacity communications, it is desirable that the dispersion of the optical transmission line be smaller in a signal wavelength band which is as wide as possible, whereby it is desirable that the dispersion slope of the optical transmission line be as small as possible.

Hence, a dispersion-compensating optical fiber has been connected to a single-mode optical fiber which is usually used for the optical transmission line, so as to reduce the dispersion of the whole optical transmission line. Namely, while the single-mode optical fiber has a positive dispersion in the 1.55-µm wavelength band, the dispersion-compensating optical fiber has a negative dispersion in this wavelength band, whereby an optical transmission line in which the single-mode optical fiber and the dispersion-compensating optical fiber are connected to each other at an appropriate length ratio reduces its dispersion as a whole.

On the other hand, since optical fiber amplifiers which can amplify optical signals in a 1.58-µm wavelength band have been developed, it has been contemplated carrying out optical communications with a further larger capacity by using not only optical signals in the 1.55-µm wavelength band (C band; 1520 nm to 1565 nm) but also those in the 1.58-µm wavelength band (L band; 1565 nm to 1620 nm).

SUMMARY OF THE INVENTION

The inventors have studied the above-mentioned background art and, as a result, have found the following problems. Namely, if the dispersion-compensating optical fiber is connected to the single-mode optical fiber in a signal wavelength band including both C and L bands, then the dispersion of the optical transmission line can be reduced to a certain extent. However, it is difficult to fully reduce dispersion in a wide range of the signal wavelength band including both C and L bands.

On the other hand, for enhancing the transmission capacity, it is effective to broaden the signal wavelength band. To this aim, it is necessary to sufficiently reduce dispersion in a wider signal wavelength band, for example, including S band (1490 nm to 1520 nm) and S+ band (1450 nm to 1490 nm) in addition to C and L bands as the signal wavelength band.

For overcoming the problems mentioned above, it is an object of the present invention to provide a dispersion-compensating system which can fully reduce dispersion in a wide signal wavelength band.

A dispersion-compensating system in accordance with the present invention is a dispersion-compensating system for a signal wavelength band of 1520 nm to 1620 nm, the system comprising: (1) a first common transmission line through which light in the signal wavelength band propagates; (2) first and second branched transmission lines branching off from the first common transmission line; (3) a demultiplexer, provided between the first common transmission line and the first and second branched transmission lines, for demultiplexing light in the signal wavelength band propagating through the first common transmission line into first and second wavelength bands, and outputting light in the first wavelength band into the first branched transmission line and light in the second wavelength band into the second branched transmission line; (4) a first dispersion-compensating device, provided on the first common transmission line, for compensating for at least a dispersion in the first wavelength band; and (5) a second dispersion-compensating device, provided on the second branched transmission line, for compensating for at least a dispersion in the second wavelength band.

According to this dispersion-compensating system, the dispersion of at least the first wavelength band in the signal wavelength band of 1520 nm to 1620 nm is compensated for by the first dispersion-compensating device provided on the first common transmission line. Then, light in the first wavelength band is separated by the demultiplexer, so as to be transmitted to the first branched transmission line. On the other hand, light in the second wavelength band is separated by the demultiplexer, so as to be transmitted to the second branched transmission line. Hence, even when the dispersion in the second wavelength band is not sufficiently compensated for by the first dispersion-compensating device, it is further compensated for by the second dispersion-compensating device provided on the second branched transmission line.

In this dispersion-compensating system, the first dispersion-compensating device may compensate for the dispersion in the first wavelength band so as to yield a dispersion deviation of ±0.5 ps/nm/km or less, more preferably, ±0.2 ps/nm/km or less, and the first and second dispersion-compensating devices may compensate for the dispersion in the second wavelength band so as to yield a dispersion deviation of ±0.5 ps/nm/km or less, more preferably, ±0.2 ps/nm/km or less. As a consequence, dispersion is fully compensated for in both of the first and second wavelength bands.

This dispersion-compensating system may further comprise a third dispersion-compensating device provided on the first branched transmission line, the first and third dispersion-compensating devices compensating for the dispersion in the first wavelength band. As a consequence, even when the dispersion in the first wavelength band has not yet fully been compensated for by the first dispersion-compensating device, it is further compensated for by the third dispersion-compensating device, provided on the first branched transmission line, after the first wavelength band is separated by the demultiplexer, whereby the dispersion is compensated for more adequately.

In this dispersion-compensating system, the first and third dispersion-compensating devices may compensate for the dispersion in the first wavelength band so as to yield a dispersion deviation of ±0.5 ps/nm/km or less, more preferably, ±0.2 ps/nm/km or less, whereas the first and second dispersion-compensating devices may compensate for the dispersion in the second wavelength band so as to yield a dispersion deviation of ±0.5 ps/nm/km or less, more preferably, ±0.2 ps/nm/km or less. As a consequence, the dispersion in the first wavelength band is fully compensated for by the first and third dispersion-compensating devices.

In this dispersion-compensating system, the first dispersion compensating device provided on the first commom line preferably has a dispersion slope compensating ratio of 60 to 150%, more preferably, 85 to 135% at wavelength of 1.55 μm.

A dispersion-compensating system in accordance with the present invention is a dispersion-compensating system for a signal wavelength band of 1520 nm to 1620 nm, the system comprising: (1) a first common transmission line through which light in the signal wavelength band propagates; (2) first and second branched transmission lines branching off from the first common transmission line; (3) a demultiplexer, provided between the first common transmission line and the first and second branched transmission lines, for demultiplexing light in the signal wavelength band propagating through the first common transmission line into first and second wavelength bands, and outputting light in the first wavelength band into the first branched transmission line and light in the second wavelength band into the second branched transmission line; (4) a first dispersion-compensating device, provided on the first branched transmission line, for compensating for a dispersion in the first wavelength band; and (5) a second dispersion-compensating device, provided on the second branched transmission line, for compensating for a dispersion in the second wavelength band.

According to this dispersion-compensating system, the first and second wavelength bands in the signal wavelength band of 1520 nm to 1620 nm are separated by the demultiplexer, and light in the first wavelength band is outputted to the first branched transmission line, whereas light in the second wavelength band is outputted to the second branched transmission line. Then, the dispersion in the first wavelength band is compensated for by the first dispersion-compensating device provided on the first branched transmission line, and the dispersion in the second wavelength band is compensated for by the second dispersion-compensating device provided on the second branched transmission line.

In this dispersion-compensating system, the first dispersion-compensating device may compensate for the dispersion in the first wavelength band so as to yield a dispersion deviation of ±0.5 ps/nm/km or less, more preferably, ±0.2 ps/nm/km or less, whereas the second dispersion-compensating device may compensate for the dispersion in the second wavelength band so as to yield a dispersion deviation of ±0.5 ps/nm/km or less, more preferably, ±0.2 ps/nm/km or less. As a consequence, dispersion is fully compensated for in both of the first and second wavelength bands.

The dispersion-compensating system may further comprise a multiplexer for multiplexing light in the first wavelength band propagating through the first branched transmission line and light in the second wavelength band propagating through the second branched transmission line. As a consequence, light in the first and second wavelength bands is multiplexed by the multiplexer. This configuration is suitably used in a repeater station. Receiving stations are not required to comprise such a multiplexer.

The dispersion-compensating system may further comprise a first optical amplifier, provided on the first branched transmission line, for amplifying light in the first wavelength band; and a second optical amplifier, provided on the second branched transmission line, for amplifying light in the second wavelength band. As a consequence, light in the first wavelength band is amplified by the first optical amplifier provided on the first branched transmission line, whereas light in the second wavelength band is amplified by the second optical amplifier provided on the second branched transmission line. Here, the first and second optical amplifiers may include a Raman amplifier.

It is preferred that the above-mentioned first to third dispersion-compensating devices each have the form of an optical fiber, whereas not only a dispersion-compensating optical fiber but also one known as a dispersion-shifted optical fiber can favorably be used. These optical fibers as a dispersion-compensating device may be laid as an optical transmission line or be formed into a module as being wound like a coil.

Though the first and second wavelength bands may be such that one of them is in the C band (1520 nm to 1565 nm) whereas the other is in the L band (1565 nm to 1620 nm), they are not restricted thereto. For example, there may be a case where one of them ranges from 1490 nm to 1520 nm, whereas the other ranges from 1520 nm to 1565 nm.

A dispersion-compensating system in accordance with the present invention comprises: (1) N dispersion-compensating devices $DC_1$ to $DC_N$ ($N \geq 2$) successively provided on a main transmission line between an input end and an output end; and (2) a demultiplexer $DIV_n$ ($2 \leq n \leq N$), provided between dispersion-compensating devices $DC_{n-1}$ and $DC_n$ in the N dispersion-compensating devices $DC_1$ to $DC_N$, for demultiplexing an optical signal outputted from the dispersion-compensating device $DC_{n-1}$, outputting an optical signal in thus demultiplexed one wavelength band to the dispersion-compensating device $DC_n$, and outputting an optical signal in the other wavelength band to a branched transmission line $P_n$. Also, a dispersion of the wavelength band demultiplexed by the demultiplexer so as to be outputted to the branched transmission line $P_n$ is compensated for by the dispersion-compensating devices $DC_1$ to $DC_{n-1}$ ($2 \leq n \leq N$) in the N dispersion-compensating devices $DC_1$ to $DC_N$.

According to this dispersion-compensating system, of the signal light fed to the input end, the optical signal in the wavelength band demultiplexed by the demultiplexer $DIV_n$ so as to be outputted to the branched transmission line $P_n$ has its dispersion compensated for by the dispersion-compensating devices $DC_1$ to $DC_{n-1}$ ($2 \leq n \leq N$) by way of which it has reached the demultiplexer $DIV_n$. The amount of dispersion compensation depends on the wavelength of optical signal.

This dispersion-compensating system may further comprise a demultiplexer $DIV_1$, provided in front of the first-stage dispersion-compensating device $DC_1$ in the N dispersion-compensating devices $DC_1$ to $DC_N$, for demultiplexing the optical signal fed to the input end, outputting an optical signal in thus demultiplexed one wavelength band to the dispersion-compensating device $DC_1$, and outputting an optical signal in the other wavelength band to a branched transmission line $P_1$. As a consequence, among the optical signals fed to the input end, the optical signal in the wavelength band demultiplexed by the demultiplexer $DIV_1$ so as to be outputted to the branched transmission line $P_1$ would not have its dispersion compensated for by any of the dispersion-compensating devices.

This dispersion-compensating system may further comprise a multiplexing section for inputting therein an optical signal outputted from the last-stage dispersion-compensating device $DC_N$ in the N dispersion-compensating devices $DC_1$ to $DC_N$ and an optical signal outputted to the branched transmission line $P_n$ from the demultiplexer $DIV_n$ ($2 \leq n \leq N$) (and further inputting therein an optical signal outputted from the demultiplexer $DIV_1$ to the branched transmission line $P_1$), multiplexing these optical signals, and outputting thus multiplexed optical signals. As a consequence, each optical signal is compensated for by a necessary amount of dispersion compensation and then is multiplexed by and outputted from the multiplexer. This is suitably used in a repeater station.

In the above-mentioned dispersion-compensating system, it is preferred that the N dispersion-compensating devices $DC_1$ to $DC_N$ each have the form of an optical fiber, whereas not only a dispersion-compensating optical fiber but also one known as a dispersion-shifted optical fiber can usually be used for dispersion compensation. These optical fibers as a dispersion-compensating device may be laid as an optical transmission line or be formed into a module as being wound like a coil. If the dispersion-compensating devices are optical fibers, then each of them is excellent in the degree of freedom in setting the amount of dispersion, whereby each can take a broad wavelength band to be subjected to dispersion compensation. It is preferred that the N demultiplexers $DIV_1$ to $DIV_n$ each use a WDM coupler. In this case a desirable wavelength band can be demultiplexed at a low cost in a simple manner.

A dispersion-compensating system in accordance with the present invention demultiplexes an optical signal inputted by way of a common transmission line into a plurality of wavelength bands and comprises a plurality of dispersion-compensating devices for compensating for respective dispersions in thus demultiplexed wavelength bands. Preferably, in this case, each of the demultiplexed wavelength bands has a wavelength band of at least 20 nm. Also, it is preferred that the number of wavelength bands to be demultiplexed is at least 2 but not greater than 5.

According to this dispersion-compensating system, the optical signal inputted by way of the common transmission line is demultiplexed into a plurality of wavelength bands, and the respective dispersions in the demultiplexed wavelength bands are individually compensated for by a plurality of dispersion-compensating devices corresponding to the respective wavelength bands.

It is preferred in this dispersion-compensating system that the wavelength bands to be demultiplexed are S+ band, S band, C band, and L band. In this case, since the optical amplifiers have their respective suitable wavelength bands for optical amplification, the optical signal can efficiently be amplified if it is demultiplexed into the above-mentioned wavelength bands.

Preferably, this dispersion-compensating system has a dispersion deviation of ±0.5 ps/nm/km or less in a signal wavelength band of 1520 nm to 1620 nm. As a consequence, transmission over a distance of 2000 km is possible by use of an optical signal at 10 Gbits/s in C and L bands. If the signal wavelength band is 1490 nm to 1620 nm, then it expands to S band in addition to C and L bands. If the signal wavelength band is 1450 nm to 1620 nm, then it expands to S+band in addition to C, L, and S bands.

If the dispersion deviation is ±0.2 ps/nm/km or less, then transmission over a distance of 5000 km is possible by use of an optical signal at 10 Gbits/s. If the dispersion deviation is ±0.1 ps/nm/km or less, then transmission over a distance of 10000 km is possible by use of an optical signal at 10 Gbits/s. If the dispersion deviation is ±0.05 ps/nm/km or less, then transmission over a distance of 5000 km is possible by use of an optical signal at 20 Gbits/s. If the dispersion deviation is ±0.025 ps/nm/km or less, then transmission over a distance of 10000 km is possible by use of an optical signal at 20 Gbits/s.

Preferably, in this dispersion-compensating system, the dispersion-compensating devices for compensating for the respective dispersions in the demultiplexed wavelength bands have a module form. As a consequence, the space for installation is reduced, and the cost of installation is cut down.

The present invention will become more fully understood from the detailed description given hereinbelow and the accompanying drawings. They are given by way of illustration only, and thus should not be considered limitative of the present invention.

DESCRIPTION OF THE PREFERRED EMBODIMENTS

In the following, preferred embodiments of the dispersion-compensating system in accordance with the present invention will be explained in detail with reference to the accompanying drawings. Here, constituents identical to each other will be ref erred to with numerals identical to each other, without repeating their overlapping explanations.

Figure 1:
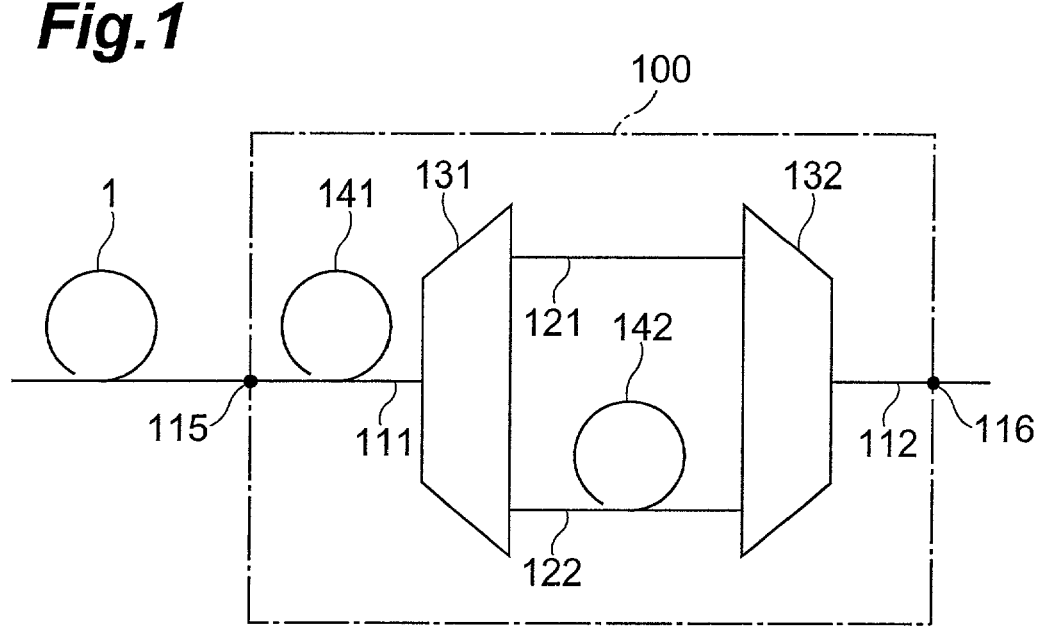
FIG. 1 is a schematic block diagram of the dispersion-compensating system in accordance with a first embodiment.

To begin with, a first embodiment of the dispersion-compensating system in accordance with the present invention will be explained. FIG. 1 is a schematic block diagram of the dispersion-compensating system 100 in accordance with the first embodiment. The dispersion-compensating system 100 comprises first and second common transmission lines 111, 112; first and second branched transmission lines 121, 122; a demultiplexer 131; a multiplexer 132; and first and second dispersion-compensating devices 141, 142. The dispersion-compensating system 100 is connected to an external single-mode optical fiber 1 by way of an input end 115 which corresponds to one end of the first common transmission line 111. Therefore, optical signals propagating through the single-mode optical fiber 1 are fed into the dispersion-compensating system 100 from the input end 115.

The demultiplexer 131 is provided between the first common transmission line 111 and the first and second branched transmission lines 121, 122. The demultiplexer 131 demultiplexes the optical signals in a signal wavelength band of 1520 nm to 1620 nm propagating through the first common transmission line 111 into C band (1520 nm to 1565 nm) and L band (1565 nm to 1620 nm). Then, the demultiplexer 131 outputs the optical signals of C band into the first branched transmission line 121 and the optical signals of L band into the second branched transmission line 122.

The multiplexer 132 is provided between the second common transmission line 112 and the first and second branched transmission lines 121, 122. The multiplexer 132 multiplexes the optical signals of C band propagating through the first branched transmission line 121 and the optical signals of L band propagating through the second branched transmission line 122, and outputs thus multiplexed optical signals to the second common transmission line 112. The optical signals outputted from the multiplexer 132 so as to propagate through the second common transmission line 112 are outputted to the outside by way of an output end 116 which corresponds to one end of the second common transmission line 112.

Here, the first dispersion-compensating device 141 is provided on the first common transmission line 111. The first dispersion-compensating device 141 compensates for the dispersion in C and L bands. However, the first dispersion-compensating device 141 cannot fully compensate for the dispersion in L band. On the other hand, the second dispersion-compensating device 142 is provided on the second branched transmission line 122. As a consequence, the dispersion in L band, which has not fully been compensated for by the first dispersion-compensating device 141, is fully compensated for by the second dispersion-compensating device 142.

Preferably, in the dispersion-compensating system 100 in accordance with the first embodiment, the first dispersion-compensating device 141 compensates for the dispersion in C band so as to yield a dispersion deviation of ±0.5 ps/nm/km or less, more preferably, ±0.2 ps/nm/km or less, whereas the first and second dispersion-compensating devices 141, 142 compensate for the dispersion in L band so as to yield a dispersion deviation of ±0.5 ps/nm/km or less, more preferably, ±0.2 ps/nm/km or less. As a consequence, dispersion can fully be reduced over a wide range of the signal wavelength band including both C and L bands. Hence, optical communications with a large capacity, e.g., at 10 to 20 Gbit/s, can be carried out.

In the dispersion-compensating system 100, the first dispersion compensating device 141 provided on the first commom line 111 preferably has a dispersion slope compensating ratio of 60 to 150%, more preferably, 85 to 135% at wavelength of 1.55 µm. As a consequence, fluctuations in dispersion among wavelengths are suppressed. The dispersion slope compensating ratio will be explained later in detail.

In the dispersion-compensating system 100 in accordance with the first embodiment, as in the foregoing, in the signal wavelength band of 1520 nm to 1620 nm, the dispersion in C band is compensated for by the first dispersion-compensating device 141, whereas the dispersion in L band is compensated for by both of the first and second dispersion-compensating devices 141, 142. As a result, the dispersion of optical transmission line can fully be reduced over a wide signal wavelength band including both C and L bands.

Figure 2:
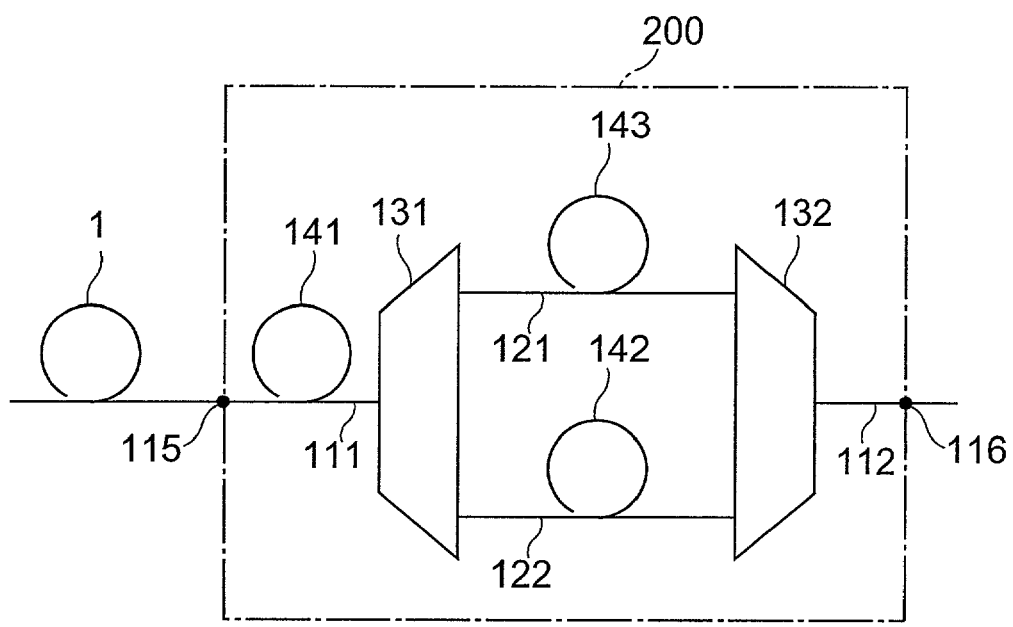
FIG. 2 is a schematic block diagram of the dispersion-compensating system in accordance with a second embodiment.

A second embodiment of the dispersion-compensating system in accordance with the present invention will now be explained. FIG. 2 is a schematic block diagram of the dispersion-compensating system 200 in accordance with the second embodiment. The dispersion-compensating system 200 further comprises a third dispersion-compensating device 143 on the first branched transmission line 121 in addition to the configuration of the dispersion-compensating system 100 in accordance with the first embodiment.

In the dispersion-compensating system 200, as in the dispersion-compensating system 100 in accordance with the first embodiment, the first dispersion-compensating device 141 is provided on the first common transmission line 111, so that the dispersion in C and L bands is compensated for by the first dispersion-compensating device 141. However, the first dispersion-compensating device 141 cannot fully compensate for the dispersion in L band. Hence, the second dispersion-compensating device 142 provided on the second branched transmission line 122 compensates for the dispersion in L band, which has not fully been compensated for by the first dispersion-compensating device 141.

Also, there are cases where not only the dispersion compensation in L band but also the dispersion compensation in C band has not yet been considered sufficient. Here, since the third dispersion-compensating device 143 is provided on the first branched transmission line 121, the dispersion in C band, which has not yet fully been compensated for by the first dispersion-compensating device 141, is compensated for by the third dispersion-compensating device 143 in the dispersion-compensating system 200 in accordance with the second embodiment.

Preferably, in the dispersion-compensating system 200 in accordance with the second embodiment, the first and third dispersion-compensating devices 141, 143 compensate for the dispersion in C band so as to yield a dispersion deviation of ±0.5 ps/nm/km or less, more preferably, ±0.2 ps/nm/km or less, and the first and second dispersion-compensating devices 141, 142 compensate for the dispersion in L band so as to yield a dispersion deviation of ±0.5 ps/nm/km or less, more preferably, ±0.2 ps/nm/km or less. As a consequence, dispersion can fully be reduced over a wide range of the signal wavelength band including both C and L bands. Hence, optical communications with a large capacity, e.g., at 10 to 20 Gbit/s, can be carried out.

In the dispersion-compensating system 200, the first dispersion compensating device 141 provided on the first commom line 111 preferably has a dispersion slope compensating ratio of 60 to 150%, more preferably, 85 to 135% at wavelength of 1.55 µm. As a consequence, fluctuations in dispersion among wavelengths are suppressed. The dispersion slope compensating ratio will be explained later in detail.

In the dispersion-compensating system 200 in accordance with the second embodiment, as in the foregoing, in the signal wavelength band of 1520 nm to 1620 nm, the dispersion in C band is compensated for by both of the first and third dispersion-compensating devices 141, 143, whereas the dispersion in L band is compensated for by both of the first and second dispersion-compensating devices 141, 142. As a result, the dispersion of optical transmission line can fully be reduced over a wide signal wavelength band including both C and L bands.

Figure 3:
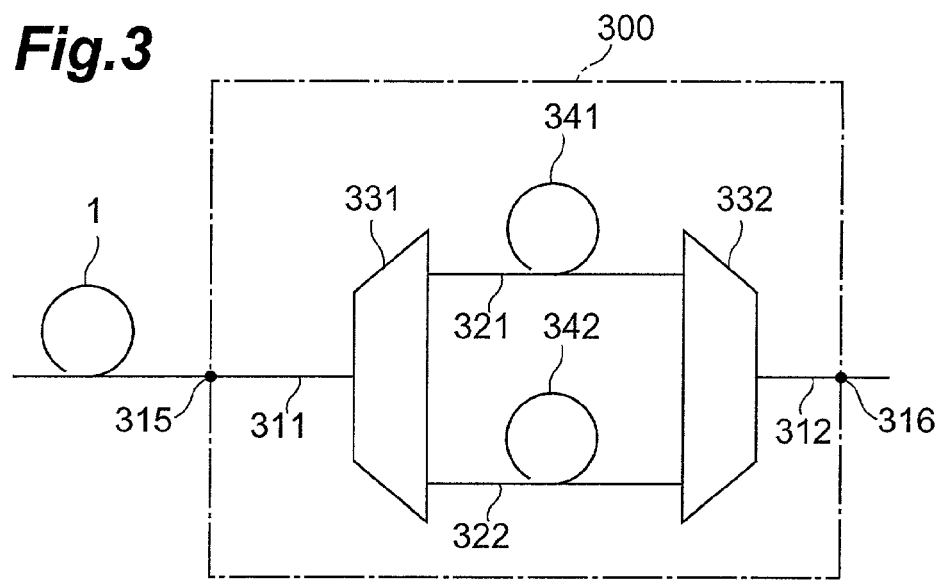
FIG. 3 is a schematic block diagram of the dispersion-compensating system in accordance with a third embodiment.

A third embodiment of the dispersion-compensating system in accordance with the present invention will now be explained. FIG. 3 is a schematic block diagram of the dispersion-compensating system 300 in accordance with the third embodiment. The dispersion-compensating system 300 comprises first and second common transmission lines 311, 312; first and second branched transmission lines 321, 322; a demultiplexer 331; a multiplexer 332; and first and second dispersion-compensating devices 341, 342. The dispersion-compensating system 300 is connected to an external single-mode optical fiber 1 by way of an input end 315 which corresponds to one end of the first common transmission line 311. Therefore, optical signals propagating through the single-mode optical fiber 1 are fed into the dispersion-compensating system 300 from the input end 315.

The demultiplexer 331 is provided between the first common transmission line 311 and the first and second branched transmission lines 321, 322. The demultiplexer 331 demultiplexes the optical signals in a signal wavelength band of 1520 nm to 1620 nm propagating through the first common transmission line 311 into C band (1520 nm to 1565 nm) and L band (1565 nm to 1620 nm). Then, the demultiplexer 331 outputs the optical signals of C band into the first branched transmission line 321 and the optical signals of L band into the second branched transmission line 322.

The multiplexer 332 is provided between the second common transmission line 312 and the first and second branched transmission lines 321, 322. The multiplexer 332 multiplexes the optical signals of C band propagating through the first branched transmission line 321 and the optical signals of L band propagating through the second branched transmission line 322, and outputs thus multiplexed optical signals to the second common transmission line 312. The optical signals outputted from the multiplexer 332 so as to propagate through the second common transmission line 312 are outputted to the outside by way of an output end 316 which corresponds to one end of the second common transmission line 312.

In the dispersion-compensating system 300, the first dispersion-compensating device 341 is provided on the first branched transmission line 321. The first dispersion-compensating device 341 compensates for the dispersion in C band. On the other hand, the second dispersion-compensating device 342 is provided on the second branched transmission line 322. The second dispersion-compensating device 342 compensates for the dispersion in L band.

Preferably, in the dispersion-compensating system 300 in accordance with the third embodiment, the first dispersion-compensating device 341 compensates for the dispersion in C band so as to yield a dispersion deviation of ±0.5 ps/nm/km or less, more preferably, ±0.2 ps/nm/km or less, and the second dispersion-compensating device 342 compensates for the dispersion in L band so as to yield a dispersion deviation of ±0.5 ps/nm/km or less, more preferably, ±0.2 ps/nm/km or less. As a consequence, dispersion can fully be reduced over a wide signal wavelength band including both C and L bands. Hence, optical communications with a large capacity, e.g., at 10 to 20 Gbit/s, can be carried out.

In the dispersion-compensating system 300 in accordance with the third embodiment, as in the foregoing, in the signal wavelength band of 1520 nm to 1620 nm, the dispersion in C band is compensated for by the first dispersion-compensating device 341, whereas the dispersion in L band is compensated for by the second dispersion-compensating devices 342. As a result, the dispersion of optical transmission line can fully be reduced over a wide signal wavelength band including both C and L bands.

Figure 4:
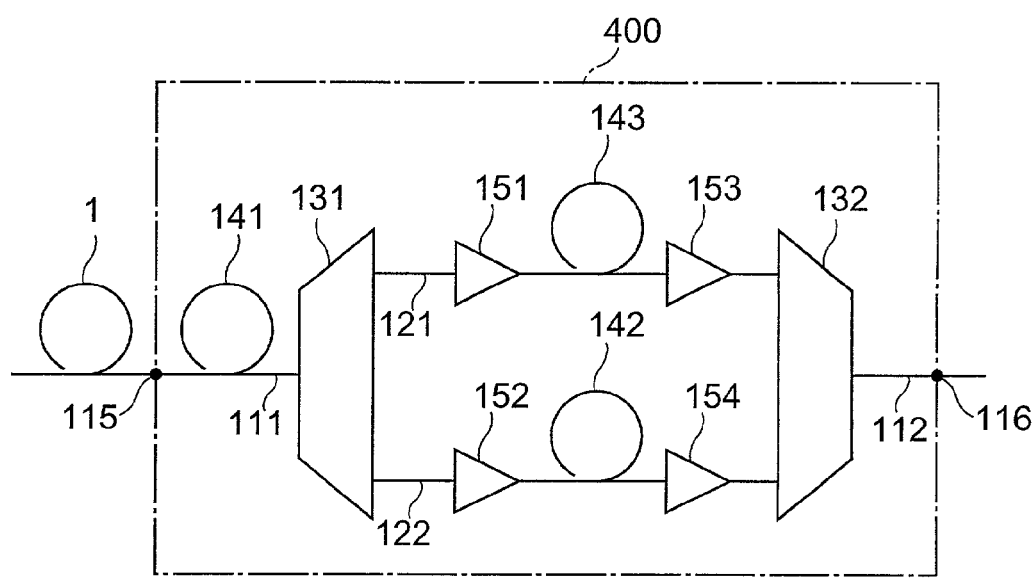
FIG. 4 is a schematic block diagram of the dispersion-compensating system in accordance with a fourth embodiment.

A fourth embodiment of the dispersion-compensating system in accordance with the present invention will now be explained. FIG. 4 is a schematic block diagram of the dispersion-compensating system 400 in accordance with the fourth embodiment. The dispersion-compensating system 400 further comprises optical amplifiers 151 to 154 in addition to the configuration of the dispersion-compensating system 200 in accordance with the second embodiment.

The optical amplifiers 151, 152 are provided on the first branched transmission line 121, and amplify the optical signals of C band. The optical amplifiers 153, 154 are provided on the second branched transmission line 122, and amplify the optical signals of L band. Here, it will be sufficient if an optical amplifier is provided on at least one of the input end side and output end side of each of the first and second branched transmission lines 121, 122. As the optical amplifier, a Raman amplifier such as one disclosed in "Crosstalk Bandwidth in Backward Pumped Fiber Raman Amplifiers" (IEEE PHOTONICS TECHNOLOGY LETTERS, NOVEMBER 1999, VOL. 11, NO. 11, pp. 1417–1449, Jun Shan Wey et al.), for example, can be used.

Thus, in the dispersion-compensating system 400 in accordance with the fourth embodiment, as for the C band in the signal wavelength band of 1520 nm to 1620 nm, its dispersion is compensated for by both of the first and third dispersion-compensating device 141, 143, and its optical signals are amplified by the optical amplifiers 151, 153. As for the L band, on the other hand, its dispersion is compensated for by both of the first and second dispersion-compensating devices 141, 142, and its optical signals are amplified by the optical amplifiers 152, 154. As a result, over a wide range of signal wavelength band including both C and L bands, the dispersion of the optical transmission line can fully be reduced, and optical signals can be amplified. The dispersion-compensating system 400 in accordance with the fourth embodiment is suitably used in a repeater station.

In the following, the above-mentioned dispersion-compensating systems 100 to 300 in accordance with the first to third embodiments will be explained in further detail with reference to specific examples, and also a preferred range of dispersion slope compensating ratio of the first dispersion compensating device 141 provided on the first common transmission line 111 at the wavelength of 1.55 μm will be explained.

Here, the dispersion slope compensating ratio will be defined. The dispersion slope compensating ratio η is defined by the expression:

$$\eta = 100 \times (S_{DCF}/D_{DCF})/(S_{SMF}/D_{SMF})$$

Here, $D_{SMF}$ is the dispersion value of the single-mode optical fiber 1 at a predetermined wavelength, whereas $S_{SMF}$ is the dispersion slope of the single-mode optical fiber 1 at the predetermined wavelength. $D_{DCF}$ is the dispersion value of a dispersion-compensating device (dispersion-compensating optical fiber) at the predetermined wavelength, whereas $S_{DCF}$ is the dispersion slope of the dispersion-compensating device (dispersion-compensating optical fiber) at the predetermined wavelength. The dispersion slope compensating ratio η indicates the degree of compensation of the dispersion slope at a predetermined wavelength when the dispersion is compensated for by 100% at this predetermined wavelength.

To begin with, a specific example of the dispersion-compensating system 100 in accordance with the first embodiment will be shown.

Figure 6A:
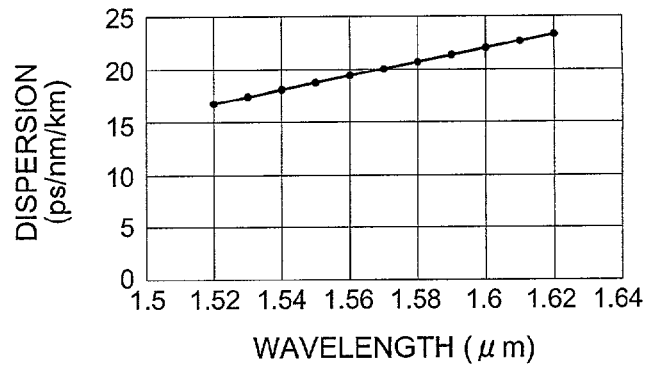
FIG. 6A is a graph showing a specific example of dispersion characteristic of a single-mode optical fiber connected to the dispersion-compensating system in accordance with the first embodiment.

Employed as the single-mode optical fiber 1 is one comprising a core made of pure silica and claddings made of silica doped with F element, while having a zero-dispersion wavelength near a wavelength of 1.3 μm. This single-mode optical fiber 1 has, at a wavelength of 1.55 μm, a dispersion of 18.8 ps/nm/km and a dispersion slope of 0.057 ps/nm²/km. FIG. 6A shows the dispersion characteristic of the single-mode optical fiber 1. In the signal wavelength band, as shown in FIG. 6A, the single-mode optical fiber 1 has a positive dispersion and a positive dispersion slope.

Figure 5A:
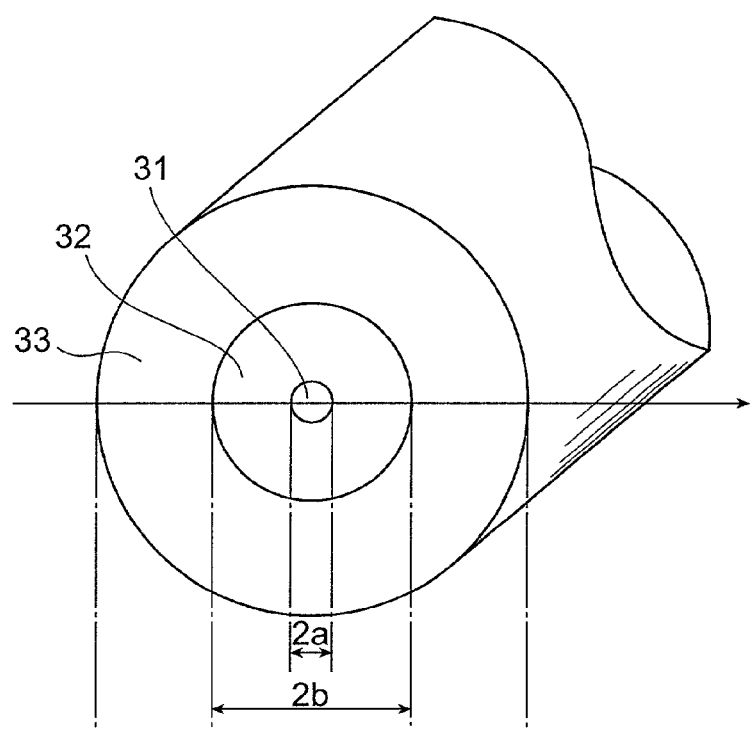
FIG. 5A is a view schematically showing the structure of a dispersion-compensating optical fiber.
Figure 5B:
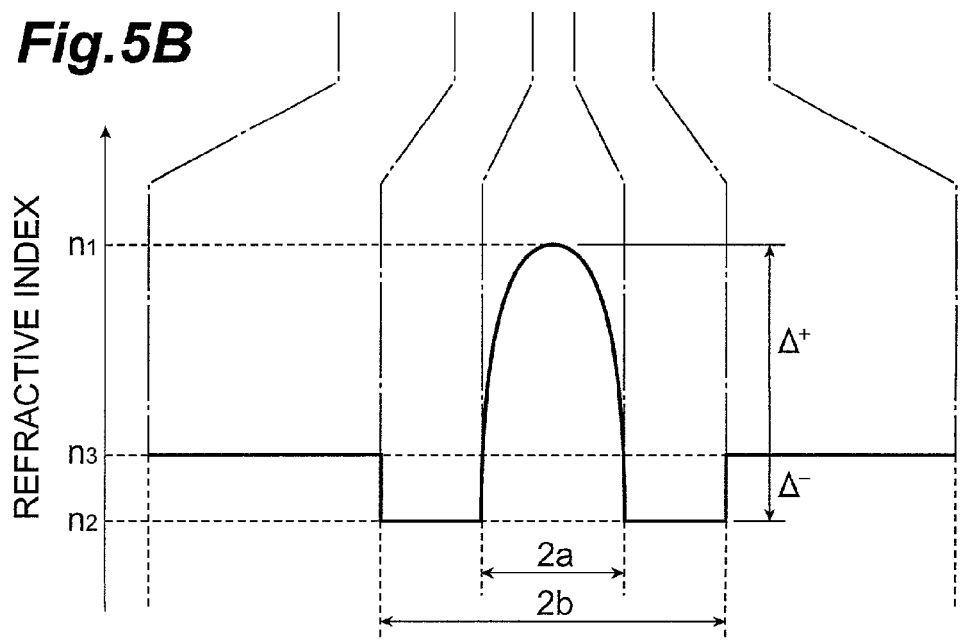
FIG. 5B is a chart showing the refractive index profile of the dispersion-compensating optical fiber.
Figure 6B:
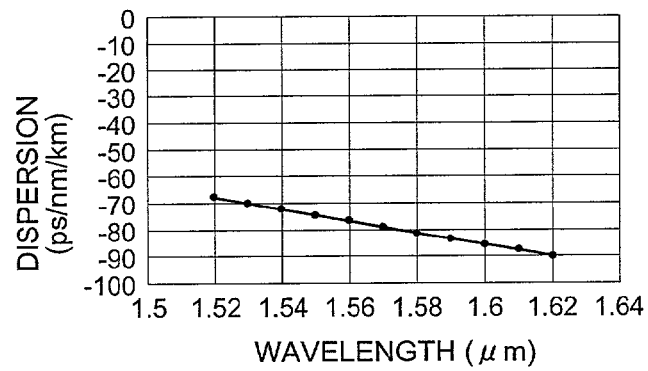
FIG. 6B is a graph showing a specific example of dispersion characteristic of the first dispersion-compensating device in the dispersion-compensating system in accordance with the first embodiment.

As the first dispersion-compensating device 141, a dispersion-compensating optical fiber having the refractive index profile shown in FIGS. 5A, 5B is used. In the first dispersion-compensating device 141, a core 31 has a diameter 2a of 3.93 g m, a first cladding 32 has an outside diameter 2b of 6.78 μm, the relative refractive index difference $\Delta^+$ of the core 31 with respect to a second cladding 33 is 1.4%, and the relative refractive index difference $\Delta^-$ of the first cladding 32 with respect to the second cladding 33 is −0.6%. Also, the first dispersion-compensating device 141 has, at a wavelength of 1.55 μm, a dispersion of −73.98 ps/nm/km and a dispersion slope of −0.209 ps/nm²/km. FIG. 6B shows the dispersion characteristic of the first dispersion-compensating device 141. In the signal wavelength band, as shown in FIG. 6B, the first dispersion-compensating device 141 has a negative dispersion with a large absolute value and a negative dispersion slope.

Figure 6C:
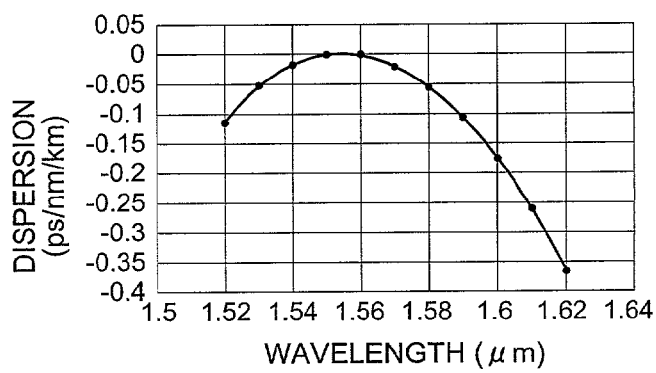
FIG. 6C is a graph showing a specific example of dispersion characteristic in the case where the single-mode optical fiber having the dispersion characteristic shown in FIG. 6A and the first dispersion-compensating device having the dispersion characteristic shown in FIG. 6B are connected to each other at a predetermined ratio.

FIG. 6C shows the total dispersion characteristic in the case where such single-mode optical fiber 1 and first dispersion-compensating device 141 are connected to each other at a length ratio of 0.8:0.2. As can be seen from FIG. 6C, the dispersion in C band is sufficiently compensated for, but the dispersion in L band is not sufficiently compensated for. Therefore, the C and L bands are separated by the demultiplexer 131, and the dispersion in L band is further compensated for by the second dispersion-compensating device 142.

Figure 7A:
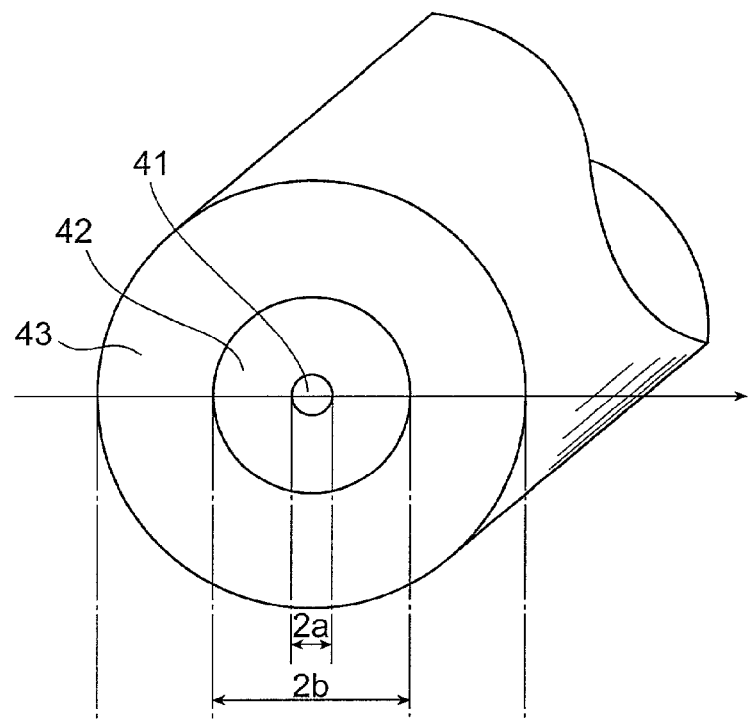
FIG. 7A is a view schematically showing the structure of a dispersion-sifted optical fiber.
Figure 7B:
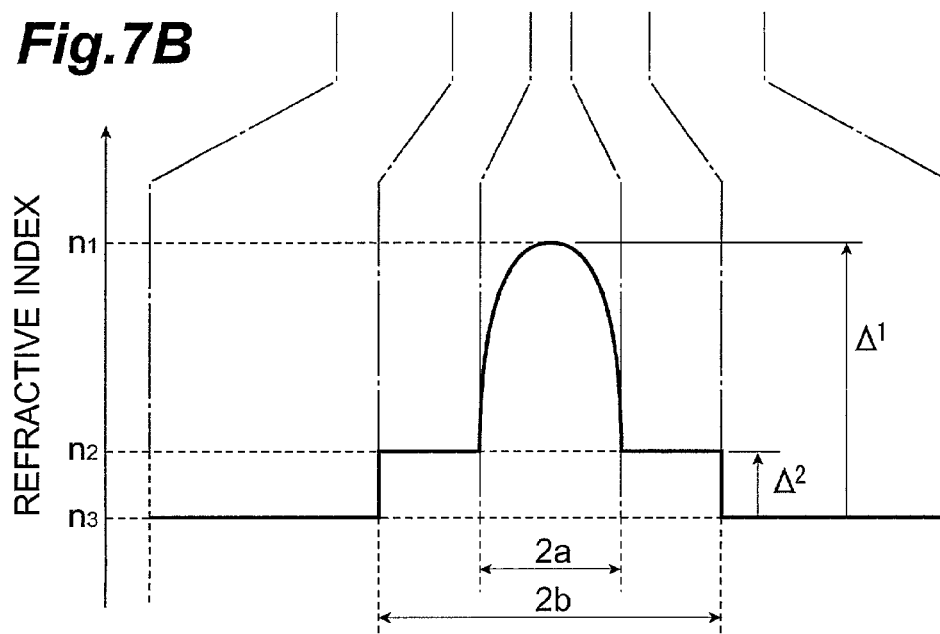
FIG. 7B is a chart showing the refractive index profile of the dispersion-shifted optical fiber.

As the second dispersion-compensating device 142, a dispersion-shifted optical fiber having the refractive index profile shown in FIGS. 7A, 7B is used. In the second dispersion-compensating device 142, a core 41 has a diameter 2a of 3.31 μm, a first cladding 42 has an outside diameter 2b of 18.40 μm, the relative refractive index difference $\Delta_1$ of the core 41 with respect to a second cladding 43 is 1.10%, and the relative refractive index difference $\Delta_2$ of the first cladding 42 with respect to the second cladding 43 is 0.14%. Also the second dispersion-compensating device 142 has a zero-dispersion wavelength of 1573 nm, whereas its dispersion slope is 0.12 ps/nm²/km at a wavelength of 1.55 μm.

To an optical fiber in which the above-mentioned single-mode optical fiber 1 and first dispersion-compensating device 141 are connected to each other at the above-mentioned ratio, the second dispersion-compensating device 142 is connected at a ratio of 56.8 m per 1 km of the former optical fiber.

Figure 6D:
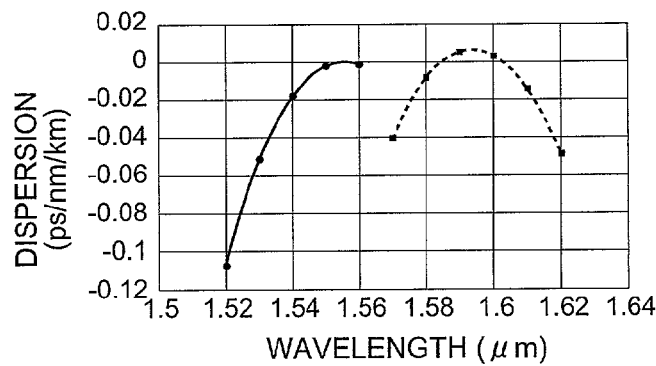
FIG. 6D is a graph showing a specific example of total dispersion characteristic in the case where the dispersion-compensating system (a dispersion slope compensating ratio of the first dispersion compensating device η is 100% at a wavelength of 1.55 μm) in accordance with the first embodiment is connected to the single-mode optical fiber having the dispersion characteristic shown in FIG. 6A.

A broken line in FIG. 6D shows the dispersion characteristic obtained when the dispersion in L band is further compensated for by the second dispersion-compensating device 142. As can be seen from FIG. 6D, the dispersion compensation in L band also becomes sufficient.

In this specific example, the dispersion slope compensating ratio η of the first dispersion compensating device 141 at a wavelength of 1.55 μm is 100%, whereby the dispersion slope is compensated for by 100% at a wavelength of 1.55 μm.

Another specific example of the dispersion-compensating system 100 in accordance with the first embodiment will now be explained.

Figure 8A:
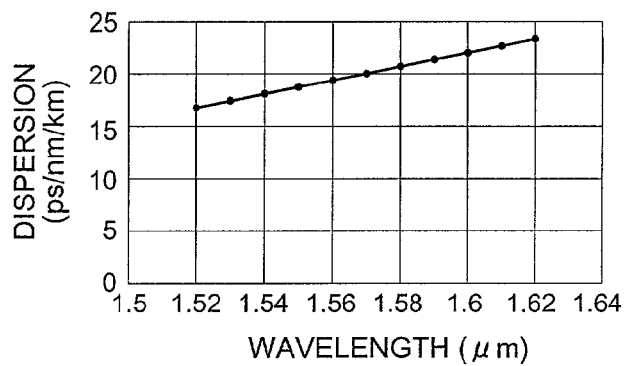
FIG. 8A is a graph showing a specific example of dispersion characteristic of a single-mode optical fiber connected to the dispersion-compensating system in accordance with the first embodiment.

Employed as the single-mode optical fiber 1 is one comprising a core made of pure silica and claddings made of silica doped with F element, while having a zero-dispersion wavelength near a wavelength of 1.3 μm. The single-mode optical fiber 1 has, at a wavelength of 1.55 μm, a dispersion of 18.8 ps/nm/km and a dispersion slope of 0.057 ps/nm²/km. FIG. 8A shows the dispersion characteristic of the single-mode optical fiber 1. In the signal wavelength band, as shown in FIG. 8A, the single-mode optical fiber 1 has a positive dispersion and a positive dispersion slope.

Figure 8B:
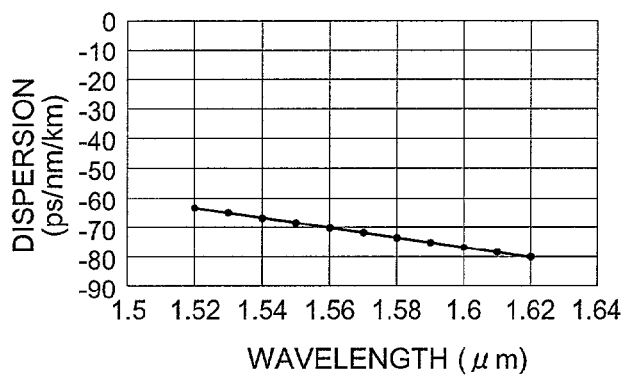
FIG. 8B is a graph showing a specific example of dispersion characteristic of the first dispersion-compensating device in the dispersion-compensating system in accordance with the first embodiment.

As the first dispersion-compensating device 141, a dispersion-compensating optical fiber having the refractive index profile shown in FIGS. 5A, 5B is used. In the first dispersion-compensating device 141, the core 31 has a diameter 2a of 3.30 μm, the first cladding 32 has an outside diameter 2b of 8.24 μm, the relative refractive index difference $\Delta^+$ of the core 31 with respect to the second cladding 33 is 1.70%, and the relative refractive index difference $\Delta^-$ of the first cladding 32 with respect to the second cladding 33 is −0.36%. Also, the first dispersion-compensating device 141 has, at a wavelength of 1.55 μm, a dispersion of −68.17 ps/nm/km and a dispersion slope of −0.144 ps/nm²/km. FIG. 7B shows the dispersion characteristic of the first dispersion-compensating device 141. In the signal wavelength band, as shown in FIG. 8B, the first dispersion-compensating device 141 has a negative dispersion with a large absolute value and a negative dispersion slope.

Figure 8C:
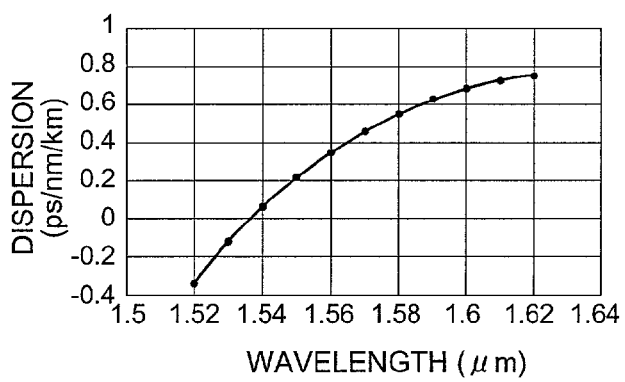
FIG. 8C is a graph showing a specific example of dispersion characteristic in the case where the single-mode optical fiber having the dispersion characteristic shown in FIG. 8A and the first dispersion-compensating device having the dispersion characteristic shown in FIG. 8B are connected to each other at a predetermined ratio.

FIG. 8C shows the total dispersion characteristic in the case where such single-mode optical fiber 1 and first dispersion-compensating device 141 are connected to each other at a length ratio of 0.786:0.214. As can be seen from FIG. 8C, though the dispersion compensation is insufficient in both C and L bands, the dispersion in L band can be compensated for, while the dispersion in C band is hard to compensate for. Therefore, the C and L bands are separated by the demultiplexer 131, and the dispersion in L band is further compensated for by the second dispersion-compensating device 142.

As the second dispersion-compensating device 142, a dispersion-compensating optical fiber having the refractive index profile shown in FIGS. 5A, 5B is used. In the second dispersion-compensating device 142, the core 31 has a diameter 2a of 4.41 μm, the first cladding 32 has an outside diameter 2b of 9.80 μm, the relative refractive index difference $\Delta^+$ of the core 31 with respect to the second cladding 33 is 1.35%, and the relative refractive index difference $\Delta^-$ of the first cladding 32 with respect to the second cladding 33 is −0.50%. The second dispersion-compensating device 142 has, at a wavelength of 1.55 μm, a dispersion of −39.9 ps/nm/km and a dispersion slope of −0.209 ps/nm²/km.

Figure 8D:
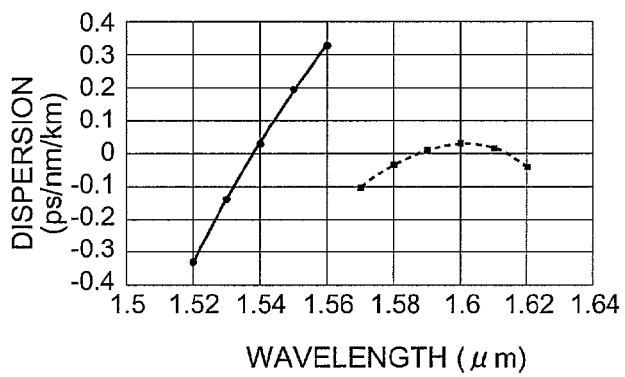
FIG. 8D is a graph showing a specific example of total dispersion characteristic in the case where the dispersion-compensating system (a dispersion slope compensating ratio of the first dispersion compensating device η is 70% at a wavelength of 1.55 μm) in accordance with the first embodiment is connected to the single-mode optical fiber having the dispersion characteristic shown in FIG. 8A.

To an optical fiber in which the above-mentioned single-mode optical fiber 1 and first dispersion-compensating device 141 are connected to each other at the above-mentioned ratio, the second dispersion-compensating device 142 is connected at a ratio of 12.6 m per 1 km of the former optical fiber. A broken line in FIG. 8D shows the dispersion characteristic obtained when the dispersion in L band is further compensated for by the second dispersion-compensating device 142. As can be seen from FIG. 8D, the dispersion compensation in L band becomes sufficient.

In this specific example, the dispersion slope compensating ratio η of the first dispersion compensating device 141 at a wavelength of 1.55 μm is 70%, whereby the dispersion slope is not fully compensated for at a wavelength of 1.55 μm.

A specific example of the dispersion-compensating system 200 in accordance with the second embodiment will now be explained.

Figure 9A:
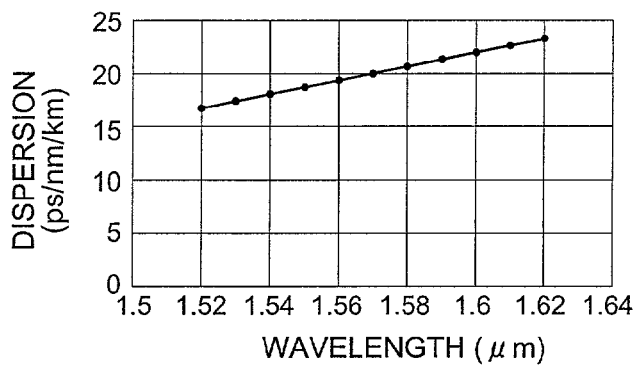
FIG. 9A is a graph showing a specific example of dispersion characteristic of a single-mode optical fiber connected to the dispersion-compensating system in accordance with the second embodiment.

Employed as the single-mode optical fiber 1 is one comprising a core made of pure silica and claddings made of silica doped with F element, while having a zero-dispersion wavelength near a wavelength of 1.3 μm. The single-mode optical fiber 1 has, at a wavelength of 1.55 μm, a dispersion of 18.8 ps/nm/km and a dispersion slope of 0.057 ps/nm$^2$/km. FIG. 9A shows the dispersion characteristic of the single-mode optical fiber 1. In the signal wavelength band, as shown in FIG. 9A, the single-mode optical fiber 1 has a positive dispersion and a positive dispersion slope.

Figure 9B:
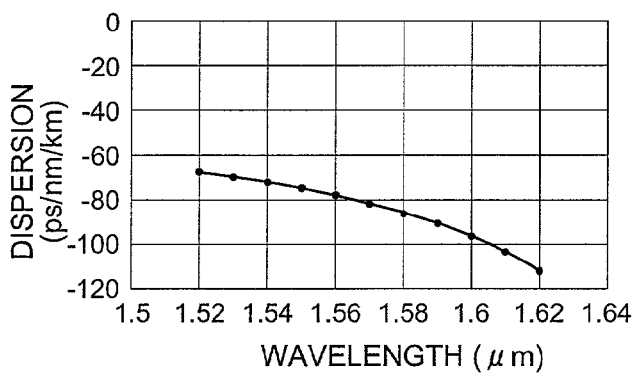
FIG. 9B is a graph showing a specific example of dispersion characteristic of the first dispersion-compensating device in the dispersion-compensating system in accordance with the second embodiment.

As the first dispersion-compensating device 141, a dispersion-compensating optical fiber having the refractive index profile shown in FIGS. 5A, 5B is used. In the first dispersion-compensating device 141, the core 31 has a diameter $2a$ of 3.16 μm, the first cladding 32 has an outside diameter $2b$ of 10.20 μm, the relative refractive index difference $\Delta^+$ of the core 31 with respect to the second cladding 33 is 1.70%, and the relative refractive index difference $\Delta^-$ of the first cladding 32 with respect to the second cladding 33 is −0.36%. Also, the first dispersion-compensating device 141 has, at a wavelength of 1.55 μm, a dispersion of −74.2 ps/nm/km and a dispersion slope of −0.316 ps/nm$^2$/km. FIG. 8B shows the dispersion characteristic of the first dispersion-compensating device 141. In the signal wavelength band, as shown in FIG. 9B, the first dispersion-compensating device 141 has a negative dispersion with a large absolute value and a negative dispersion slope.

Figure 9C:
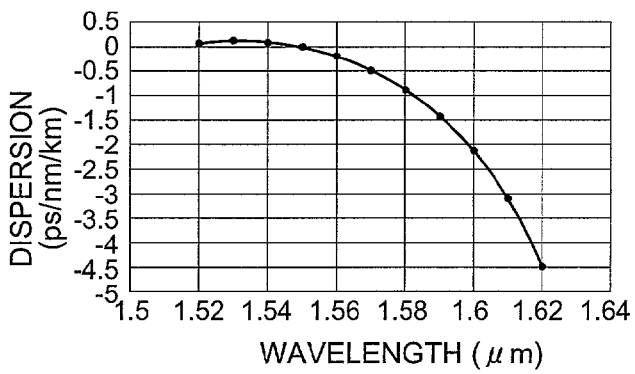
FIG. 9C is a graph showing a specific example of dispersion characteristic in the case where the single-mode optical fiber having the dispersion characteristic shown in FIG. 9A and the first dispersion-compensating device having the dispersion characteristic shown in FIG. 9B are connected to each other at a predetermined ratio.

FIG. 9C shows the total dispersion characteristic in the case where such single-mode optical fiber 1 and first dispersion-compensating device 141 are connected to each other at a length ratio of 0.798:0.202. As can be seen from FIG. 9C, the dispersion compensation in L band is insufficient, and the dispersion compensation in C band is not considered sufficient. Therefore, the C and L bands are separated by the demultiplexer 131, and the dispersion in L band is further compensated for by the second dispersion-compensating device 142, whereas the dispersion in C band is further compensated for by the third dispersion-compensating device 143.

As the second and third dispersion-compensating device 142, 143, a dispersion-shifted optical fibers having the refractive index profile shown in FIGS. 7A, 7B are used.

In the second dispersion-compensating device 142, a core 41 has a diameter $2a$ of 3.28 μm, a first cladding 42 has an outside diameter $2b$ of 18.2 μm, the relative refractive index difference $\Delta_1$ of the core 41 with respect to a second cladding 43 is 1.10%, and the relative refractive index difference $\Delta_2$ of the first cladding 42 with respect to the second cladding 43 is 0.14%. Also the second dispersion-compensating device 142 has a zero-dispersion wavelength of 1568 nm, whereas its dispersion slope is 0.12 ps/nm$^2$/km at a wavelength of 1.55 μm. To an optical fiber in which the above-mentioned single-mode optical fiber 1 and first dispersion-compensating device 141 are connected to each other, the second dispersion-compensating device 142 is connected at a ratio of 660 m per 1 km of the former optical fiber.

In the third dispersion-compensating device 143, a core 41 has a diameter $2a$ of 3.17 μm, a first cladding 42 has an outside diameter $2b$ of 17.6 μm, the relative refractive index difference $\Delta_1$ of the core 41 with respect to a second cladding 43 is 1.10%, and the relative refractive index difference $\Delta_2$ of the first cladding 42 with respect to the second cladding 43 is 0.14%. Also the third dispersion-compensating device 143 has a zero-dispersion wavelength of 1545 nm, whereas its dispersion slope is 0.12 ps/nm$^2$/km at a wavelength of 1.55 μm. To the optical fiber in which the above-mentioned single-mode optical fiber 1 and first dispersion-compensating device 141 are connected to each other, the third dispersion-compensating device 143 is connected at a ratio of 54 m per 1 km of the former optical fiber.

Figure 9D:
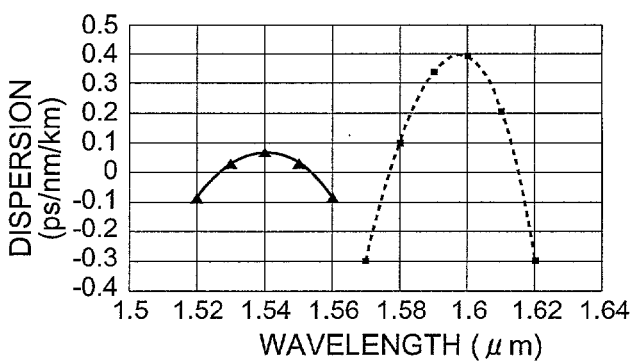
FIG. 9D is a graph showing a specific example of total dispersion characteristic in the case where the dispersion-compensating system (a dispersion slope compensating ratio of the first dispersion compensating device η is 135% at a wavelength of 1.55 μm) in accordance with the second embodiment is connected to the single-mode optical fiber having the dispersion characteristic shown in FIG. 9A.

In FIG. 9D, a broken line indicates the dispersion characteristic obtained when the dispersion in L band is further compensated for by the second dispersion-compensating device 142, whereas a solid line indicates the dispersion characteristic obtained when the dispersion in C band is further compensated for by the third dispersion-compensating device 143. As can be seen from FIG. 9D, dispersion is sufficiently compensated for in both C and L bands.

In this specific example, the dispersion slope compensating ration of the first dispersion compensating device 141 at a wavelength of 1.55 μm is 135%, whereby the first and third dispersion-compensating devices 141,143 compensate for the dispersion slope at a wavelength of 1.55 μm in excess.

A specific example of the dispersion-compensating system 300 in accordance with the third embodiment will now be explained.

Figure 10A:
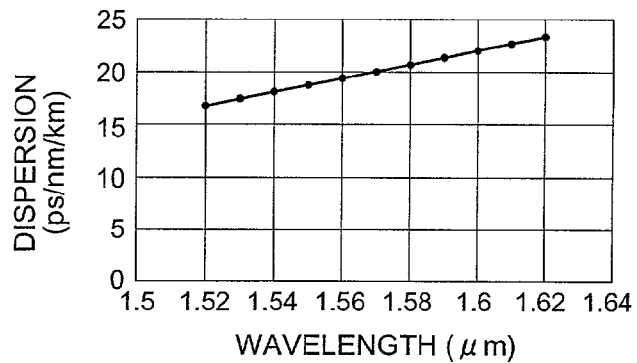
FIG. 10A is a graph showing a specific example of dispersion characteristic of a single-mode optical fiber connected to the dispersion-compensating system in accordance with the third embodiment.

Employed as the single-mode optical fiber 1 is one comprising a core made of pure silica and claddings made of silica doped with F element, while having a zero-dispersion wavelength near a wavelength of 1.3 μm. The single-mode optical fiber 1 has, at a wavelength of 1.55 μm, a dispersion of 18.8 ps/nm/km and a dispersion slope of 0.057 ps/nm$^2$/km. Also, this single-mode optical fiber 1 has, at a wavelength of 1.58 μm, a dispersion of 20.8 ps/nm/km and a dispersion slope of 0.057 ps/nm$^2$/km. FIG. 10A shows the dispersion characteristic of the single-mode optical fiber 1. In the signal wavelength band, as shown in FIG. 10A, the single-mode optical fiber 1 has a positive dispersion and a positive dispersion slope.

Figure 10B:
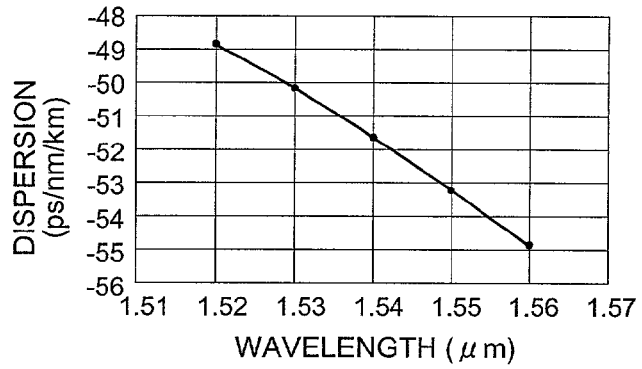
FIG. 10B is a graph showing a specific example of dispersion characteristic of the first dispersion-compensating device in the dispersion-compensating system in accordance with the third embodiment.

As the first dispersion-compensating device 341, a dispersion-compensating optical fiber having the refractive index profile shown in FIGS. 5A, 5B is used. In the first dispersion-compensating device 341, the core 31 has a diameter $2a$ of 4.60 μm, the first cladding 32 has an outside diameter $2b$ of 7.09 μm, the relative refractive index difference $\Delta^+$ of the core 31 with respect to the second cladding 33 is 1.4%, and the relative refractive index difference $\Delta^-$ of the first cladding 32 with respect to the second cladding 33 is −0.7%. Also, the first dispersion-compensating device 341 has, at a wavelength of 1.55 μm, a dispersion of −53.20 ps/nm/km and a dispersion slope of −0.162 ps/nm$^2$/km. FIG. 10B shows the dispersion characteristic of the first dispersion-compensating device 341. In the signal wavelength band, as shown in FIG. 10B, the first dispersion-compensating device 341 has a negative dispersion with a large absolute value and a negative dispersion slope.

Figure 10C:
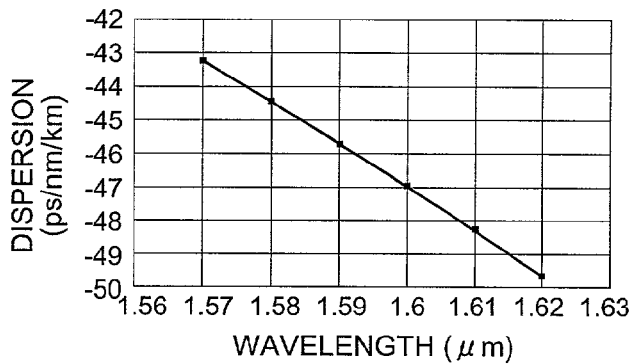
FIG. 10C is a graph showing a specific example of dispersion characteristic of the second dispersion-compensating device in the dispersion-compensating system in accordance with the third embodiment.

As the second dispersion-compensating device 342, a dispersion-compensating optical fiber having the refractive index profile shown in FIGS. 5A, 5B is also used. In the second dispersion-compensating device 342, the core 31 has a diameter $2a$ of 4.75 μm, the first cladding 32 has an outside diameter 2b of 7.20 μm, the relative refractive index difference Δ⁺ of the core 31 with respect to the second cladding 33 is 1.4%, and the relative refractive index difference Δ⁻ of the first cladding 32 with respect to the second cladding 33 is −0.7%. Also, the second dispersion-compensating device 342 has, at a wavelength of 1.58 μm, a dispersion of −44.44 ps/nm/km and a dispersion slope of −0.122 ps/nm²/km. FIG. 10C shows the dispersion characteristic of the second dispersion-compensating device 342. In the signal wavelength band, as shown in FIG. 10C, the second dispersion-compensating device 342 has a negative dispersion with a large absolute value and a negative dispersion slope.

Figure 10D:
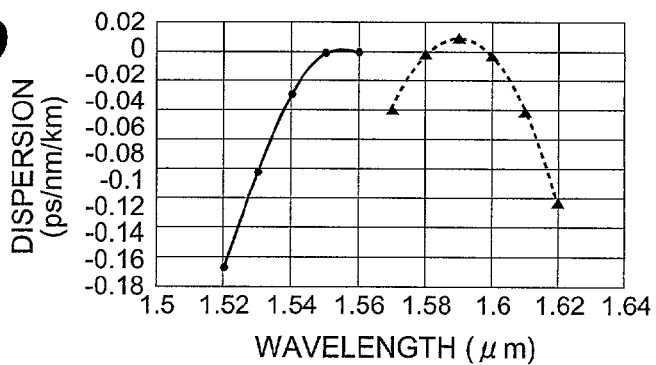
FIG. 10D is a graph showing a specific example of total dispersion characteristic in the case where the dispersion-compensating system (a dispersion slope compensating ratio of the first dispersion compensating device η is 100% at a wavelength of 1.55 μm) in accordance with the third embodiment is connected to the single-mode optical fiber having the dispersion characteristic shown in FIG. 10A.

A solid line in FIG. 10D shows the total dispersion characteristic obtained when such single-mode optical fiber 1 and first dispersion-compensating device 341 are connected to each other at a length ratio of 1:0.35. On the other hand, a broken line in FIG. 10D shows the total dispersion characteristic obtained when such single-mode optical fiber 1 and second dispersion-compensating device 342 are connected to each other at a length ratio of 1:0.46. As can be seen from FIG. 10D, the dispersion in C band is compensated for by the first dispersion-compensating device 341, whereas the dispersion in L band is compensated for by the second dispersion-compensating device 342, whereby dispersion is sufficiently compensated for in the signal wavelength band including the C and L band.

In this specific example, the dispersion slope compensating ratio η of the first dispersion compensating device 141 at a wavelength of 1.55 μm is 100%, whereby the dispersion slope is compensated for by 100% at a wavelength of 1.55 μm.

Figure 11:
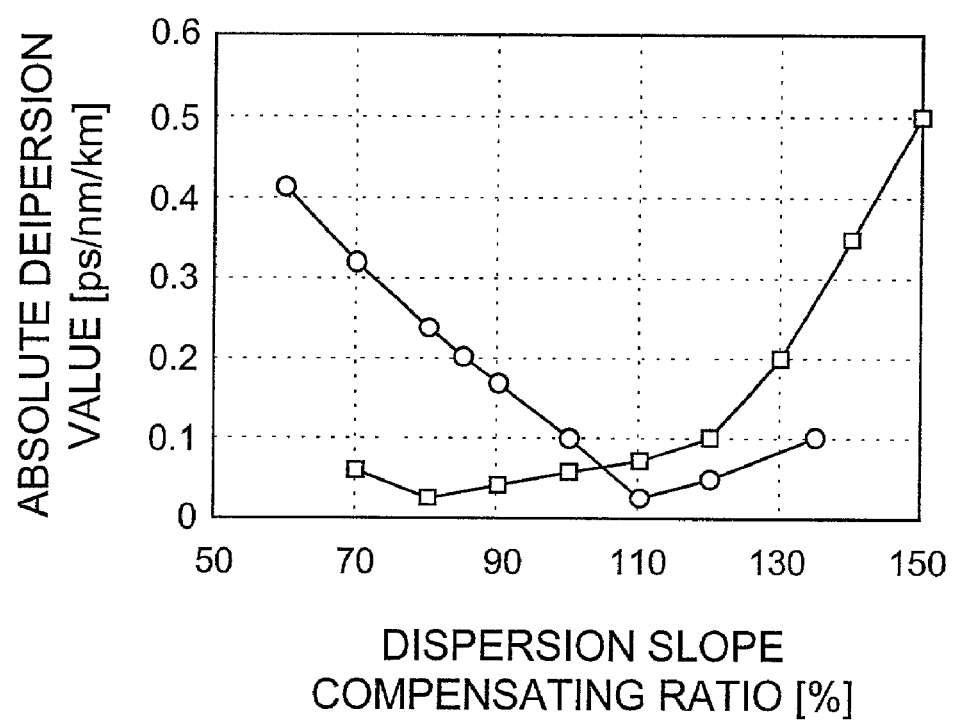
FIG. 11 is a graph showing the relationship between the dispersion slope compensating ratio of the first dispersion compensating device provided on the first common transmission line at the wavelength of 1.55 μm and the dispersion deviation in this dispersion compensating system.

The inventors have studied dispersion characteristics concerning many specific examples including those mentioned above. FIG. 11 shows the relationship between the dispersion slope compensating ratio of the first dispersion compensating device 141 provided on the first common transmission line 111 at the wavelength of 1.55 μm and the dispersion deviation in this dispersion compensating system 100,200 in the signal wavelength band including the C band(indicated by hollow bullets) and L band(indicated by hollow triangles).

As shown in FIG. 11, the dispersion slope compensating ratio of the first dispersion compensating device 141 provided on the first common transmission line 111 at the wavelength of 1.55 μm needs to fall within a range of 60 to 150% so as to yield a dispersion deviation of ±0.5 ps/nm/km. Moreover, the dispersion slope compensating ratio of the first dispersion compensating device 141 provided on the first common transmission line 111 at the wavelength of 1.55 μm needs to fall within a range of 85 to 130% so as to yield a dispersion deviation of ±0.2 ps/nm/km.

Thus, the inventors have found that a preferred range of the dispersion slope compensating ratio η of the first dispersion compensating device 141 provided on the first common transmission line 111 at the wavelength of 1.55 μm is 60 to 150%, more preferably, 85 to 130%. If the dispersion slope compensating ratio η of the first dispersion compensating device 141 provided on the first common transmission line 111 at the wavelength of 1.55 μm lies within this range, then fluctuations in dispersion among wavelengths are suppressed.

Figure 12:
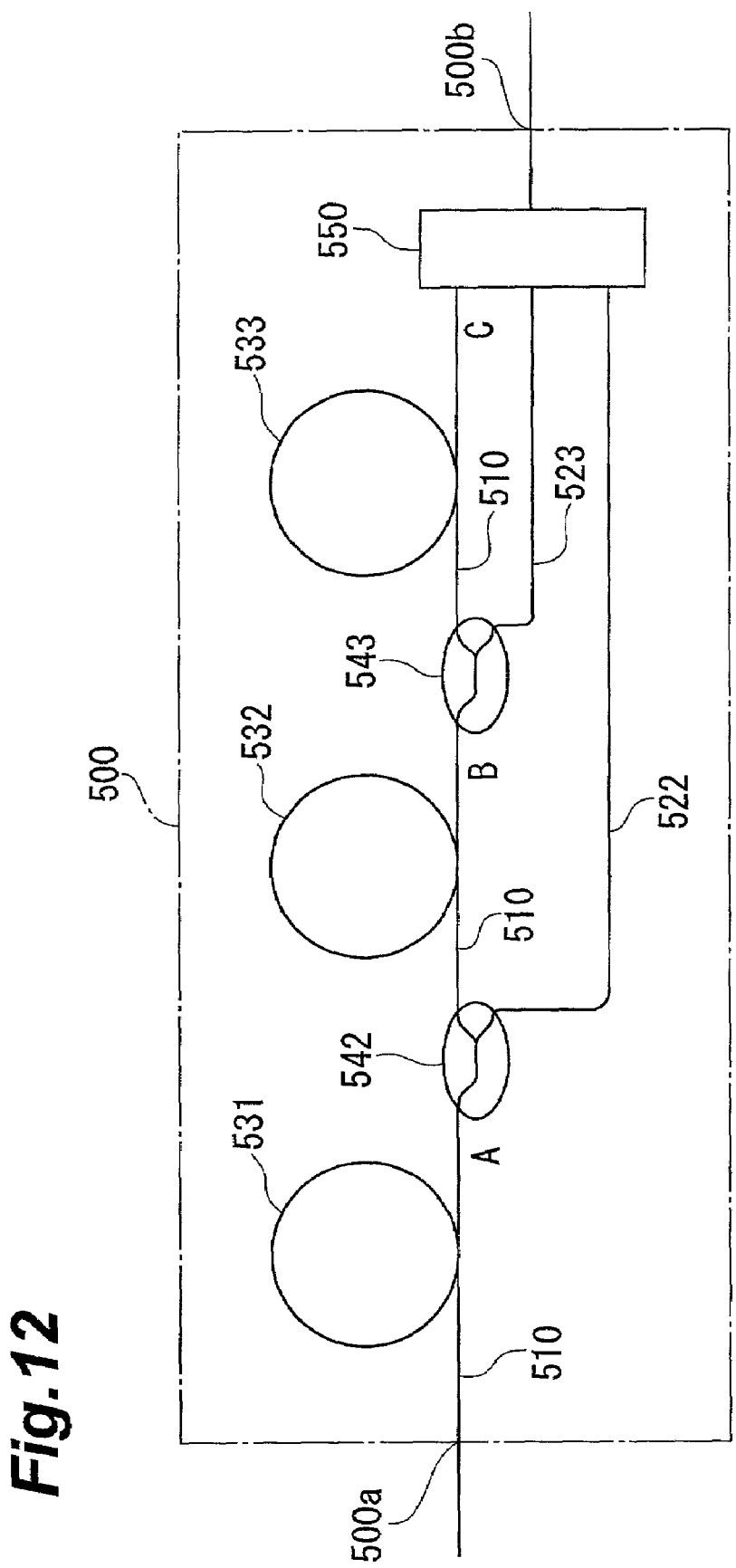
FIG. 12 is a schematic block diagram of the dispersion-compensating system in accordance with a fifth embodiment.

A fifth embodiment of the dispersion-compensating system in accordance with the present invention will now be explained. FIG. 12 is a schematic block diagram of the dispersion-compensating system 500 in accordance with the fifth embodiment. The dispersion-compensating system 500 comprises, successively on a main transmission line 510 between an input end 500a and an output end 500b, a dispersion-compensating device 531, a demultiplexer 542, a dispersion-compensating device 532, a demultiplexer 543, a dispersion-compensating device 533, and a multiplexer 550. Each of the dispersion-compensating devices 531 to 533 is preferably a dispersion-compensating optical fiber, whereas each of the demultiplexers 542, 543 is a WDM coupler.

The demultiplexer 542 demultiplexes optical signals (e.g., in a signal wavelength band of 1490 nm to 1620 nm) outputted from the dispersion-compensating device 531, outputs the optical signals in a first wavelength band (e.g., S band of 1490 nm to 1520 nm) as one of thus demultiplexed wavelength bands to a branched transmission line 522, and outputs the optical signals in the remaining wavelength band to the dispersion-compensating device 532. The demultiplexer 543 demultiplexes the optical signals outputted from the dispersion-compensating device 532, outputs the optical signals in a second wavelength band (e.g., C band of 1520 nm to 1565 nm) as one of thus demultiplexed wavelength bands to a branched transmission line 523, and outputs the optical signals in the remaining third wavelength band (e.g., L band of 1565 nm to 1620 nm) to the dispersion-compensating device 533. The multiplexer 550 multiplexes the optical signals in the first wavelength band demultiplexed by the demultiplexer 542 so as to propagate through the branched transmission line 522, the optical signals in the second wavelength band demultiplexed by the demultiplexer 543 so as to propagate through the branched transmission line 523, and the optical signals outputted from the dispersion-compensating device 533, and outputs thus multiplexed optical signals. The optical signals outputted from the multiplexer 550 are outputted to the outside of the dispersion-compensating system 500 from the output end 500b.

In this dispersion-compensating system 500, among the optical signals inputted from the input end 500a, the optical signals in the first wavelength band demultiplexed by the demultiplexer 542 so as to be outputted to the output end 500b by way of the branched transmission line 522 and multiplexer 550 are subjected to dispersion compensation by the dispersion-compensating device 531 alone. The optical signals in the second wavelength band demultiplexed by the demultiplexer 543 so as to be outputted to the output end 500b by way of the branched transmission line 523 and multiplexer 550 are subjected to dispersion compensation by the dispersion-compensating devices 531, 532. The optical signals in the third wavelength band outputted by the dispersion-compensating device 533 to the output end 500b by way of the multiplexer 550 are subjected to dispersion compensation by the dispersion-compensating devices 531 to 533.

Figure 13A:
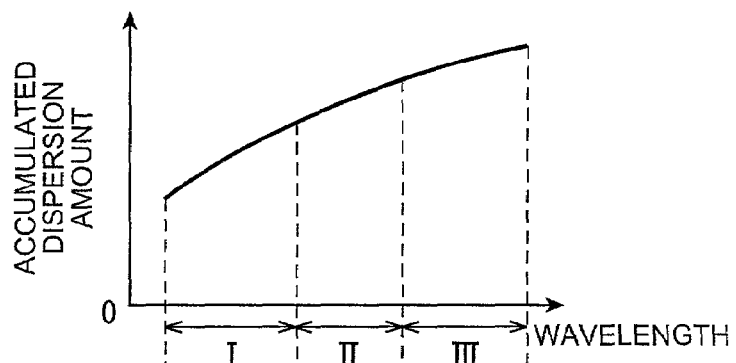
FIG. 13A is a graph showing a specific example of accumulated dispersion amount of optical signals fed to the dispersion-compensating system in accordance with the fifth embodiment.

Two specific operational examples of the dispersion-compensating system 500 in accordance with this embodiment will now be explained. FIGS. 13A to 13D are charts for explaining a first specific example of dispersion compensating operations of the dispersion-compensating system 500 in accordance with the fifth embodiment. In the first specific example, the dispersion-compensating device 531 has a negative dispersion in the wavelength band including the first to third wavelength bands. The dispersion-compensating device 532 has a negative dispersion in the wavelength band including the second and third wavelength bands. The dispersion-compensating device 533 has a negative dispersion in the third wavelength band. As shown in FIG. 13A, the optical signals inputted from the input end 500a have a positive accumulated dispersion amount and a positive slope of accumulated dispersion amount in the wavelength band including the first to third wavelength bands I to III.

Figure 13B:
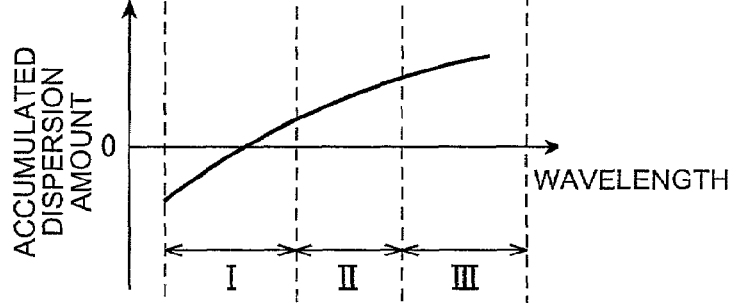
FIG. 13B is a graph showing a specific example of accumulated dispersion amount at point A (see FIG. 12) of optical signals fed to the dispersion-compensating system in accordance with the fifth embodiment.

In the first specific example, the accumulated dispersion amount of the optical signals outputted from the dispersion-compensating device 531 at the first stage so as to be fed to the demultiplexer 542 (optical signals at point A in FIG. 12) is reduced, in the wavelength band including the first to third wavelength bands I to III, by the dispersion-compensating device 531 having a negative dispersion. Here, the optical signals in the first wavelength band I have a sufficiently small accumulated dispersion amount as shown in FIG. 13B, whereby they are outputted to the branched transmission line 522. However, the optical signals in the second and third wavelength bands II, III still have a large accumulated dispersion amount, so that they are fed to the dispersion-compensating device 532.

Figure 13C:
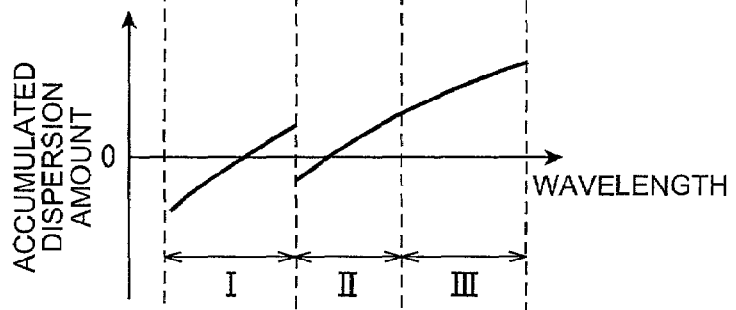
FIG. 13C is a graph showing a specific example of accumulated dispersion amount at point B (see FIG. 12) of optical signals fed to the dispersion-compensating system in accordance with the fifth embodiment.

The accumulated dispersion amount of the optical signals outputted from the dispersion-compensating device 532 at the middle stage so as to be fed to the demultiplexer 543 (optical signals at point B in FIG. 12) is reduced, in the wavelength band including the second and third wavelength bands II and III, by the dispersion-compensating device 532 having a negative dispersion. Here, the optical signals in the second wavelength band II have a sufficiently small accumulated dispersion amount as shown in FIG. 13C, whereby they are outputted to the branched transmission line 523. However, the optical signals in the third wavelength band III still have a large accumulated dispersion amount, so that they are fed to the dispersion-compensating device 533.

Figure 13D:
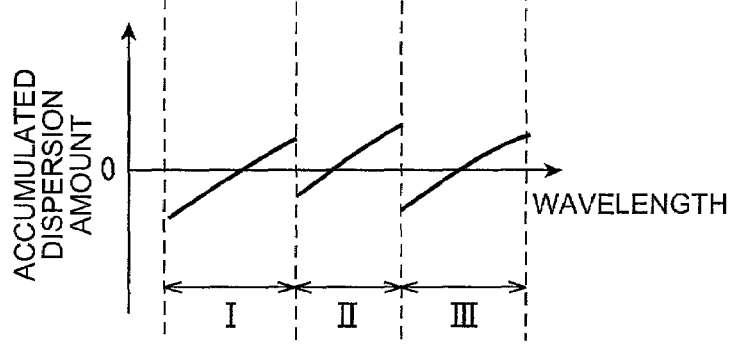
FIG. 13D is a graph showing a specific example of accumulated dispersion amount at point C (see FIG. 12) of optical signals fed to the dispersion-compensating system in accordance with the fifth embodiment.

The accumulated dispersion amount of the optical signals outputted from the dispersion-compensating device 533 at the last stage so as to be fed to the multiplexer 550 (optical signals at point C in FIG. 12) is reduced, in the third wavelength band III, by the dispersion-compensating device 533 having a negative dispersion. As a result, the accumulated dispersion amount of the optical signals in the third wavelength band III becomes sufficiently small as shown in FIG. 13D. Thus, the accumulated dispersion amount of the optical signals outputted from the multiplexer 550 to the output end 500b becomes sufficiently small in the wavelength band including the first to third wavelength bands I to III.

Figure 14A:
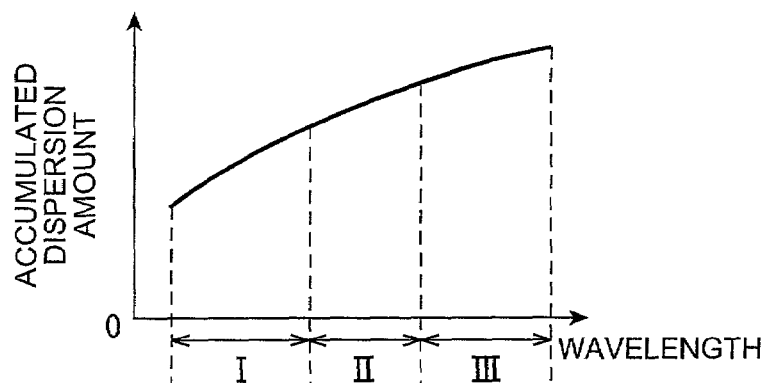
FIG. 14A is a graph showing a specific example of accumulated dispersion amount of optical signals fed to the dispersion-compensating system in accordance with the fifth embodiment.

FIGS. 14A to 14D are charts for explaining a second specific example of dispersion compensating operations of the dispersion-compensating system 500 in accordance with the fifth embodiment. In the second specific example, both dispersion and dispersion slope of the dispersion-compensating device 531 are negative in the wavelength band including the first to third wavelength bands. In the dispersion-compensating device 532, both dispersion and dispersion slope are positive in the wavelength band including the second and third wavelength bands. In the dispersion-compensating device 533, both dispersion and dispersion slope are positive in the third wavelength band. The optical signals inputted from the input end 500a have a positive accumulated dispersion amount and a positive slope of accumulated dispersion amount in the wavelength band including the first to third wavelength bands I to III as shown in FIG. 14A.

Figure 14B:
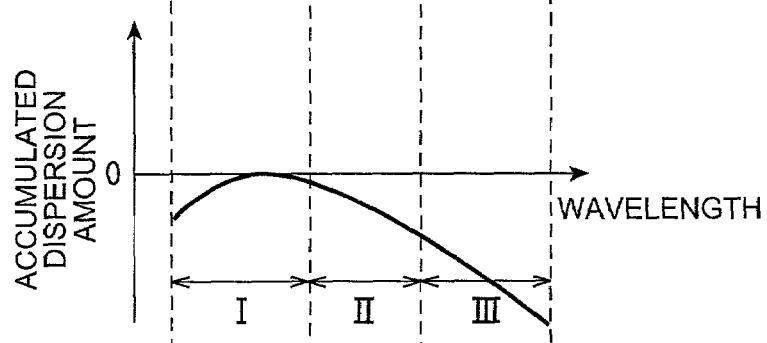
FIG. 14B is a graph showing another specific example of accumulated dispersion amount at point A (see FIG. 12) of optical signals fed to the dispersion-compensating system in accordance with the fifth embodiment.

In the second specific example, the accumulated dispersion amount of the optical signals outputted from the dispersion-compensating device 531 at the first stage so as to be fed to the demultiplexer 542 (optical signals at point A in FIG. 12) is reduced, in the wavelength band including the first to third wavelength bands I to III, by the dispersion-compensating device 531 whose dispersion and dispersion slope are both negative. Here, the optical signals in the first wavelength band I have a sufficiently small accumulated dispersion amount as shown in FIG. 14B, whereby they are outputted to the branched transmission line 522. However, the optical signals in the second and third wavelength bands II, III enhance their accumulated dispersion amount in the negative direction, so that they are fed to the dispersion-compensating device 532.

Figure 14C:
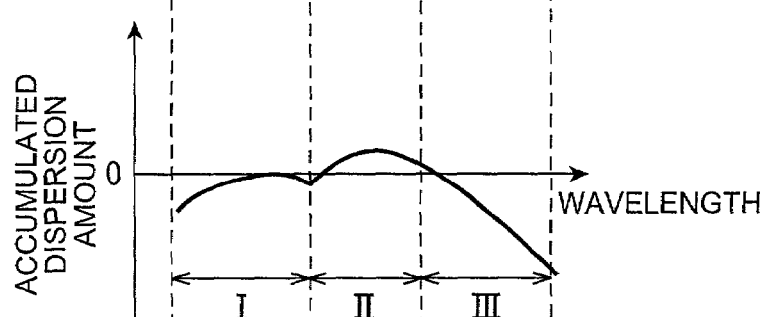
FIG. 14C is a graph showing another specific example of accumulated dispersion amount at point B (see FIG. 12) of optical signals fed to the dispersion-compensating system in accordance with the fifth embodiment.

The accumulated dispersion amount of the optical signals outputted from the dispersion-compensating device 532 at the middle stage so as to be fed to the demultiplexer 543 (optical signals at point B in FIG. 12) is reduced, in the wavelength band including the second and third wavelength bands II and III, by the dispersion-compensating device 532 whose dispersion and dispersion slope are both positive. Here, the optical signals in the second wavelength band II have a sufficiently small accumulated dispersion amount as shown in FIG. 14C, whereby they are outputted to the branched transmission line 523. However, the optical signals in the third wavelength band III still have a large accumulated dispersion amount in the negative direction, so that they are fed to the dispersion-compensating device 533.

Figure 14D:
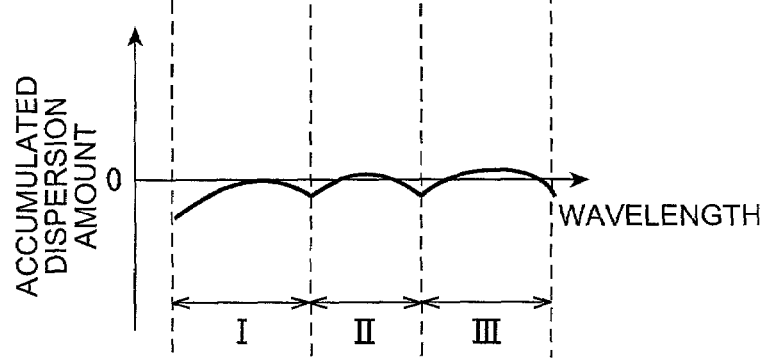
FIG. 14D is a graph showing another specific example of accumulated dispersion amount at point C (see FIG. 12) of optical signals fed to the dispersion-compensating system in accordance with the fifth embodiment.

The accumulated dispersion amount of the optical signals outputted from the dispersion-compensating device 533 at the last stage so as to be fed to the multiplexer 550 (optical signals at point C in FIG. 12) is reduced, in the third wavelength band III, by the dispersion-compensating device 533 whose chromatic dispersion and dispersion slope are both positive. As a result, the accumulated dispersion amount of the optical signals in the third wavelength band III becomes sufficiently small as shown in FIG. 14D. Thus, the accumulated dispersion amount of the optical signals outputted from the multiplexer 550 to the output end 500b becomes sufficiently small in the wavelength band including the first to third wavelength bands I to III.

Thus, in the dispersion-compensating system 500, the respective optical signals in the first to third wavelength bands are subjected to different numbers of dispersion-compensating devices, whereby appropriate dispersion compensation is effected. As a consequence, the dispersion-compensating system 500 can reduce accumulated dispersion over a wide wavelength band including the first to third wavelength bands.

Figure 15:
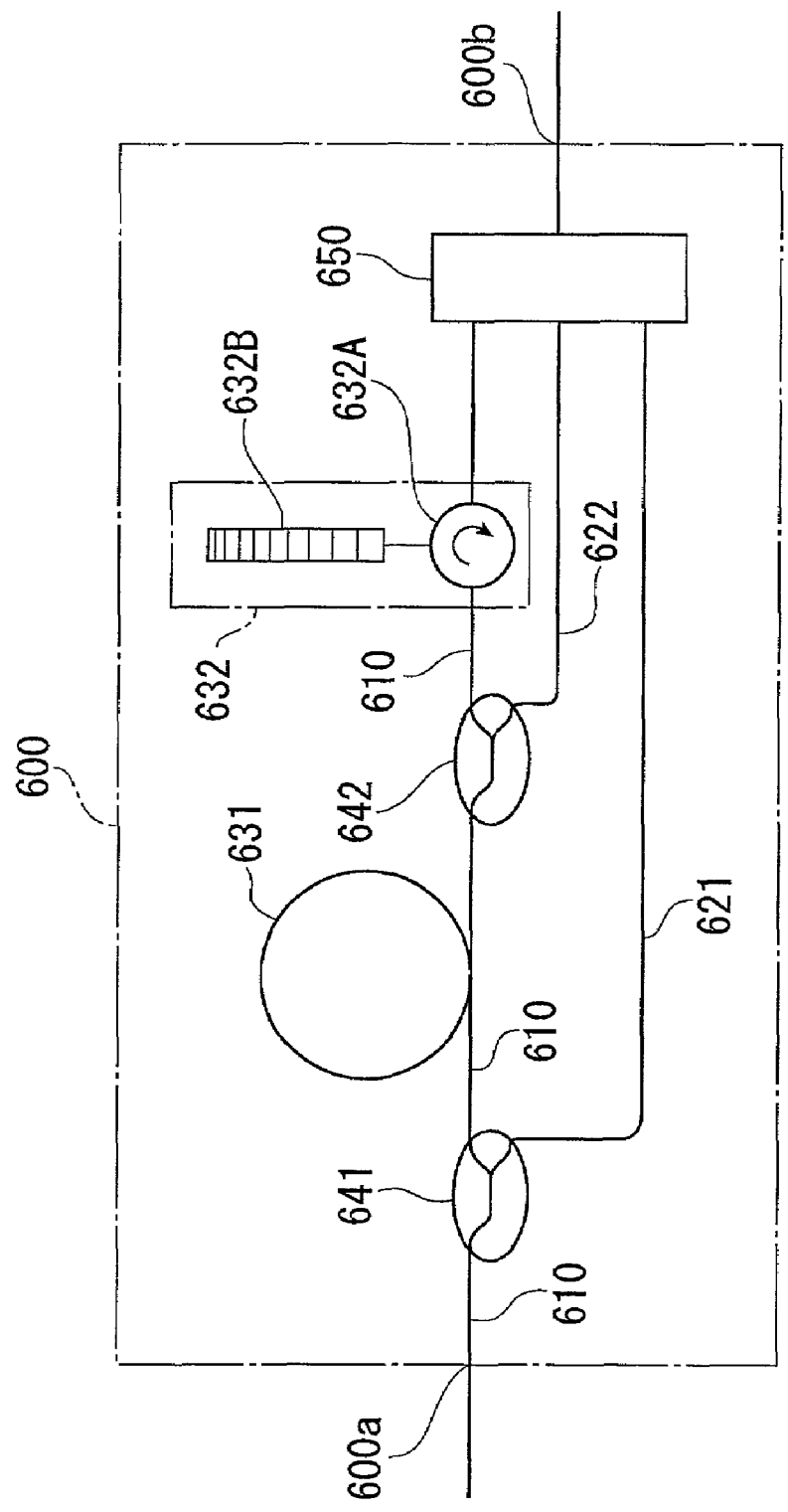
FIG. 15 is a schematic block diagram of the dispersion-compensating system in accordance with a sixth embodiment.

A sixth embodiment of the dispersion-compensating system in accordance with the present invention will now be explained. FIG. 15 is a schematic block diagram of the dispersion-compensating system 600 in accordance with the sixth embodiment. The dispersion-compensating system 600 comprises, successively on a main transmission line 610 between an input end 600a and an output end 600b, a demultiplexer 641, a dispersion-compensating device 631, a demultiplexer 642, a dispersion-compensating device 632, and a multiplexer 650. Preferably, each of the demultiplexers 641, 642 is a WDM coupler.

The demultiplexer 641 demultiplexes optical signals (e.g., in a signal wavelength band of 1490 nm to 1620 nm) fed from the input end 600a, outputs the optical signals in a first wavelength band (e.g., S band of 1490 nm to 1520 nm) as one of thus demultiplexed wavelength bands to a branched transmission line 621, and outputs the optical signals in the remaining wavelength band to the dispersion-compensating device 631. The demultiplexer 642 demultiplexes the optical signals outputted from the dispersion-compensating device 631, outputs the optical signals in a second wavelength band (e.g., C band of 1520 nm to 1565 nm) as one of thus demultiplexed wavelength bands to a branched transmission line 622, and outputs the optical signals in the remaining third wavelength band (e.g., L band of 1565 nm to 1620 nm) to the dispersion-compensating device 632. The multiplexer 650 multiplexes the optical signals in the first wavelength band outputted from the demultiplexer 642 so as to propagate through the branched transmission line 621, the optical signals in the second wavelength band outputted from the demultiplexer 642 so as to propagate through the branched transmission line 622, and the optical signals outputted from the dispersion-compensating device 632, and outputs thus multiplexed optical signals. The optical signals outputted from the multiplexer 650 are outputted to the outside of the dispersion-compensating system 600 from the output end 600b.

In this embodiment, the dispersion-compensating device 631 is a dispersion-compensating optical fiber, whereas the dispersion-compensating device 632 comprises a three-terminal circulator 632A and a chirped fiber grating 632B. The three-terminal circulator 632A outputs to the chirped fiber grating 632B the optical signals fed from the demultiplexer 642, and also outputs to the multiplexer 650 the optical signals fed from the chirped fiber grating 632B. The chirped fiber grating 632B is a fiber grating having a refractive index modulation formed in the optical waveguide region of an optical fiber, in which intervals of the refractive index modulation changes longitudinally. Light having a certain wavelength is reflected at a position where the refractive index modulation has an interval satisfying Bragg condition therefor. Namely, the dispersion of the optical signals reaching the multiplexer 650 from the demultiplexer 642 is compensated for by this action in the dispersion-compensating device 632 comprising the three-terminal circulator 632A and chirped fiber grating 632B, since these optical signals travel over different optical path lengths depending on their wavelength.

As a consequence, among the optical signals fed to the input end 600a in this dispersion-compensating system 600, the optical signals in the first wavelength band outputted to the output end 600b from the demultiplexer 641 by way of the branched transmission line 621 and multiplexer 650 would not be subjected to dispersion compensation. The optical signals in the second wavelength band outputted to the output end 600b from the demultiplexer 642 by way of the branched transmission line 622 and multiplexer 650 are subjected to dispersion compensation by the dispersion-compensating device 631 alone. The optical signals in the third wavelength band outputted to the output end 600b from the dispersion-compensating device 632 by way of the multiplexer 650 are subjected to dispersion compensation by the dispersion-compensating devices 631 and 632.

Thus, in the dispersion-compensating system 600, the optical signals in the first wavelength band, for which no dispersion compensation is necessary, are outputted without any dispersion compensation. The respective optical signals in the second and third wavelength bands, for which dispersion compensation is necessary, are subjected to different numbers of dispersion-compensating devices, whereby appropriate dispersion compensation is effected. As a consequence, the dispersion-compensating system 600 can reduce accumulated dispersion over a wide wavelength band including the first to third wavelength bands.

Figure 16:
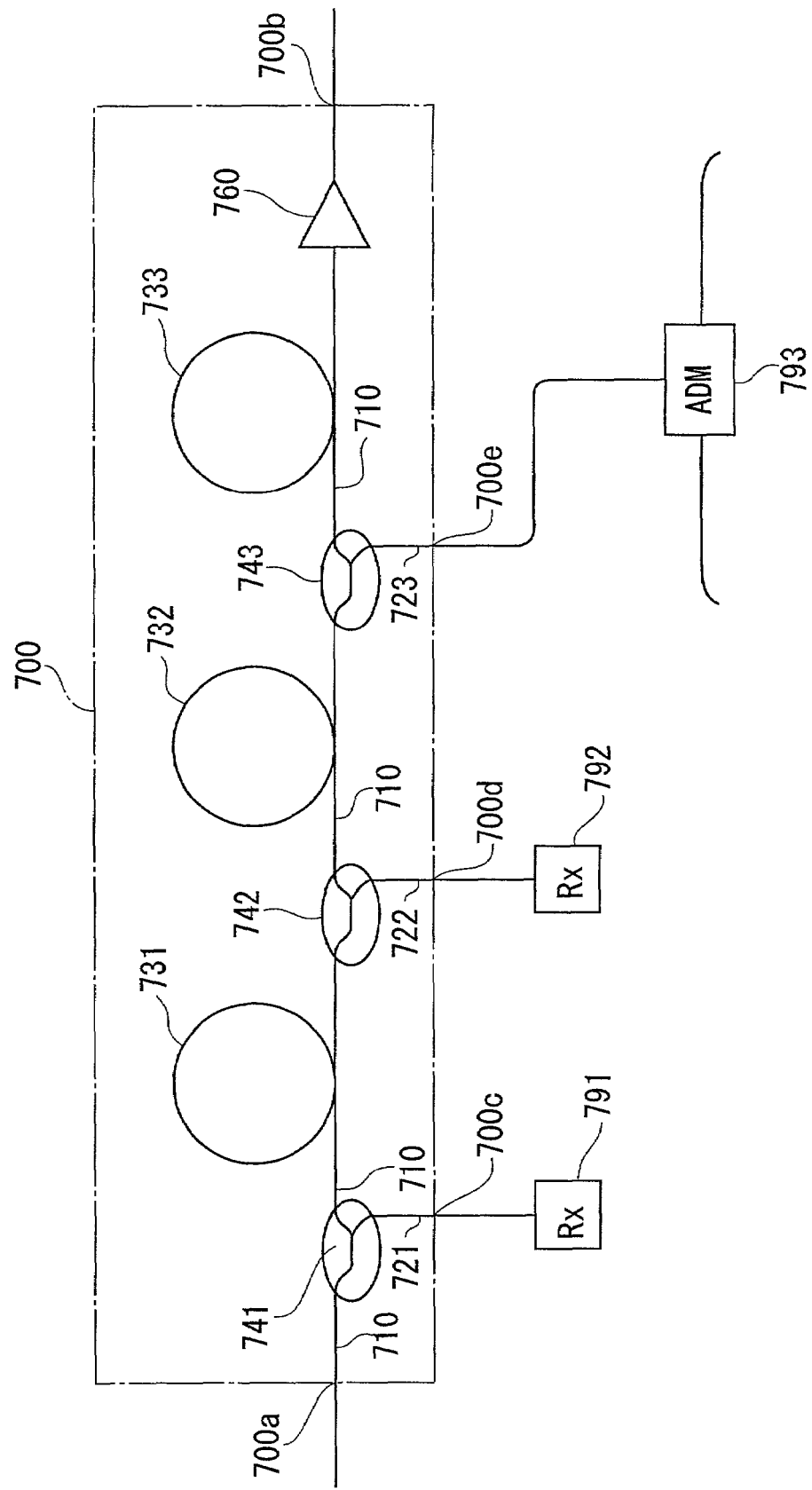
FIG. 16 is a schematic block diagram of the dispersion-compensating system in accordance with a seventh embodiment.

A seventh embodiment of the dispersion-compensating system in accordance with the present invention will now be explained. FIG. 16 is a schematic block diagram of the dispersion-compensating system 700 in accordance with the seventh embodiment. The dispersion-compensating system 700 comprises, successively on a main transmission line 710 between an input end 700a and an output end 700b, a demultiplexer 741, a dispersion-compensating device 731, a demultiplexer 742, a dispersion-compensating device 732, a demultiplexer 743, a dispersion-compensating device 733, and an optical amplifier 760. Also, this diagram shows receivers 791, 792 and an ADM (Add-Drop Multiplexer) 793. Preferably, each of the dispersion-compensating devices 731 to 733 is a dispersion-compensating optical fiber, whereas each of the demultiplexers 741 to 743 is a WDM coupler.

The demultiplexer 741 demultiplexes optical signals (e.g., in a signal wavelength band of 1450 nm to 1620 nm) fed from the input end 700a, outputs the optical signals in a first wavelength band (e.g., S+ band of 1450 nm to 1490 nm) as one of thus demultiplexed wavelength bands to an output end 700c by way of a branched transmission line 721, and outputs the optical signals in the remaining wavelength band to the dispersion-compensating device 731. The demultiplexer 742 demultiplexes the optical signals outputted from the dispersion-compensating device 731, outputs the optical signals in a second wavelength band (e.g., S band of 1490 nm to 1520 nm) as one of thus demultiplexed wavelength bands to an output end 700d by way of a branched transmission line 722, and outputs the optical signals in the remaining wavelength band to the dispersion-compensating device 732. The demultiplexer 743 demultiplexes the optical signals outputted from the dispersion-compensating device 732, outputs the optical signals in a third wavelength band (e.g., C band of 1520 nm to 1565 nm) as one of thus demultiplexed wavelength bands to an output end 700e by way of a branched transmission line 723, and outputs the optical signals in the remaining fourth wavelength band (e.g., L band of 1565 nm to 1620 nm) to the dispersion-compensating device 733. The optical amplifier 760 amplifies the optical signals outputted from the dispersion-compensating device 733 and outputs thus amplified optical signals to the output end 700b.

In the dispersion-compensating system 700, among the optical signals fed from the input end 700a, the optical signals in the first wavelength band demultiplexed by the demultiplexer 741 so as to be outputted to the output end 700c by way of the branched transmission line 721 are received by the receiver 791 without being subjected to dispersion compensation by any dispersion-compensating device. The optical signals in the second wavelength band demultiplexed by the demultiplexer 742 so as to be outputted to the output end 700d by way of the branched transmission line 722 are subjected to dispersion compensation by the dispersion-compensating device 731 alone and are received by the receiver 792. The optical signals in the third wavelength band demultiplexed by the demultiplexer 743 so as to be outputted to the output end 700e by way of the branched transmission line 723 are subjected to dispersion compensation by the dispersion-compensating devices 731, 732 and are transmitted to other systems by way of the ADM 793. The optical signals in the fourth wavelength band outputted to the output end 700b are subjected to dispersion compensation by the dispersion-compensating devices 731 to 733 and are amplified by the optical amplifier 760, so as to be transmitted to later stages.

Thus, in the dispersion-compensating system 700, the optical signals in the first wavelength band, for which no dispersion compensation is necessary, are outputted from the output end 700c without any dispersion compensation and are received by the receiver 791. The respective optical signals in the second to fourth wavelength bands are subjected to different numbers of dispersion-compensating devices, whereby appropriate dispersion compensation is effected, so as to be outputted from their corresponding output ends 700b, 700d, and 700e. The optical signals in the fourth wavelength band sent out to later stages are amplified by the optical amplifier 760 and then are outputted from the output end 700*b*. As a consequence, the dispersion-compensating system 700 can be employed as a functional apparatus capable of selecting optical signals over a wide wavelength band including the first to fourth wavelength bands while reducing their accumulated dispersion.

Figure 17:
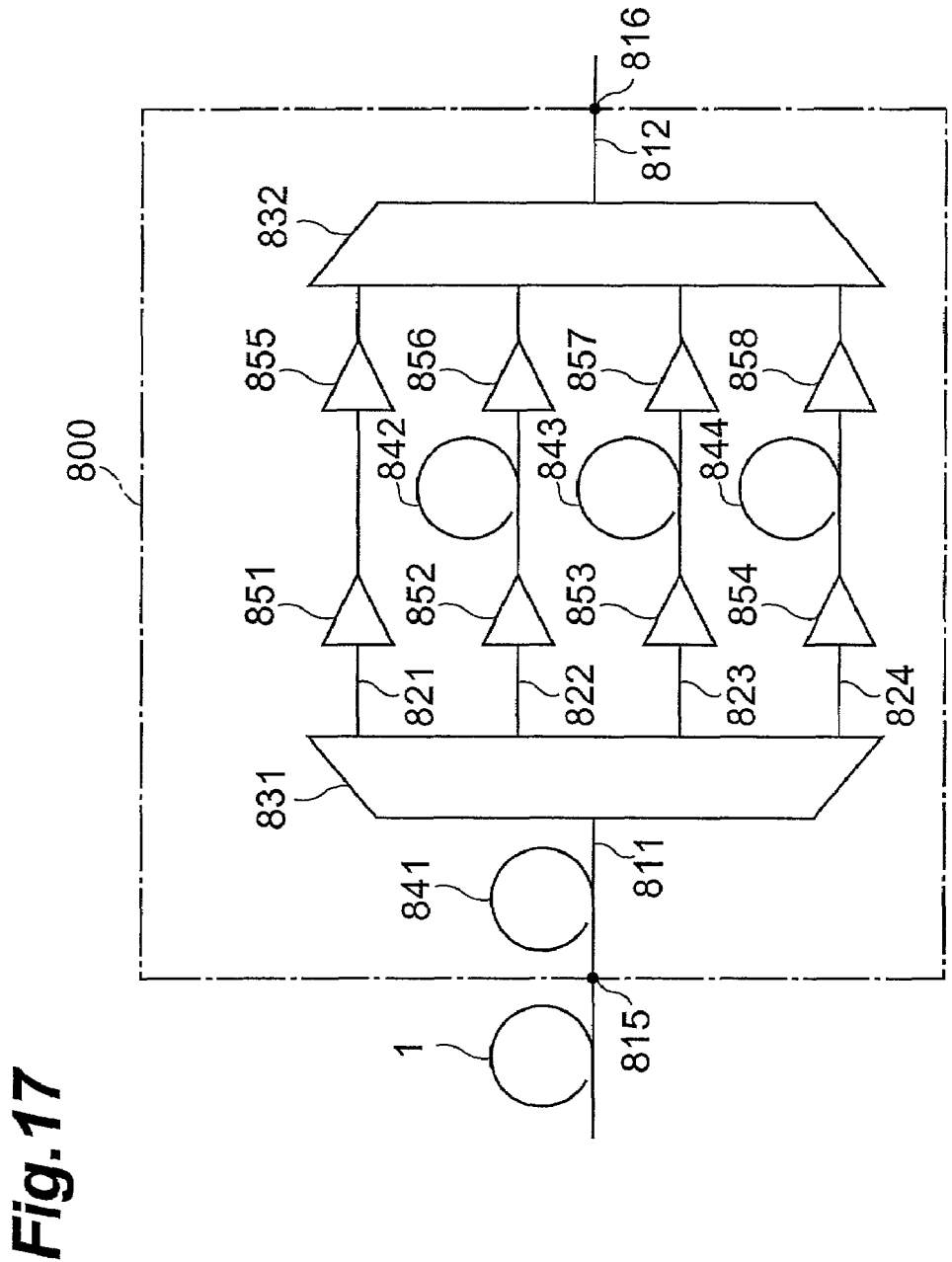
FIG. 17 is a schematic block diagram of the dispersion-compensating system in accordance with an eighth embodiment.

An eighth embodiment of the dispersion-compensating system in accordance with the present invention will now be explained. FIG. 17 is a schematic block diagram of the dispersion-compensating system 800 in accordance with the eighth embodiment. The dispersion-compensating system 800 comprises first and second common transmission lines 811, 812, first to fourth branched transmission lines 821 to 824, a demultiplexer 831, a multiplexer 832, and first to fourth dispersion-compensating devices 841 to 844. The dispersion-compensating system 800 is connected to an external single-mode optical fiber 1 by way of an input end corresponding to one end of the first common transmission line 811. As a consequence, the optical signals propagating through the single-mode optical fiber 1 are fed to the dispersion-compensating system 800 from the input end 815.

The demultiplexer 831 is provided between the first common transmission line 811 and the first to fourth branched transmission lines 821 to 824. The demultiplexer 831 demultiplexes the optical signals in the signal wavelength band of 1450 nm to 1620 nm propagating through the first common transmission line 811 into S+ band (1450 nm to 1490 nm), S band (1490 nm to 1520 nm), C band (1520 nm to 1565 nm), and L band (1565 nm to 1620 nm). Also, the demultiplexer 831 outputs the optical signals in S+ band to the first branched transmission line 821, the optical signals in S band to the second branched transmission line 822, the optical signals in C band to the third branched transmission line 823, and the optical signals in L band to the fourth branched transmission line 824.

The multiplexer 832 is provided between the second common transmission line 812 and the first to fourth branched transmission lines 821 to 824. The multiplexer 832 multiplexes the optical signals in S+ band propagating through the first branched transmission line 821, the optical signals in S band propagating through the second branched transmission line 822, the optical signals in C band propagating through the third branched transmission line 823, and the optical signals in L band propagating through the fourth branched transmission line 824, and outputs thus multiplexed optical signals to the second common transmission line 812. The optical signals outputted from the multiplexer 832 so as to propagate through the second common transmission line 812 are outputted to the outside by way of an output end 816 which corresponds to one end of the second common transmission line 812.

Here, the first dispersion-compensating device 841 is provided on the first common transmission line 811. The first dispersion-compensating device 841 compensates for the dispersion in S+, S, C and L bands. However, though the first dispersion-compensating device 841 can fully compensate for the dispersion in S+ band, it cannot sufficiently compensate for the dispersion in S, C, and L bands. On the other hand, the second dispersion-compensating device 842 is provided on the second branched transmission line 822. As a consequence, the dispersion in S band, which has not sufficiently been compensated for by the first dispersion-compensating device 841, is fully compensated for by the second dispersion-compensating device 842. Also, the third dispersion-compensating device 843 is provided on the third branched transmission line 823. Therefore, the dispersion in C band, which has not sufficiently been compensated for by the first dispersion-compensating device 841, is fully compensated for by the third dispersion-compensating device 843. Further, the fourth dispersion-compensating device 844 is provided on the fourth branched transmission line 824. As a consequence, the dispersion in L band, which has not sufficiently been compensated for by the first dispersion-compensating device 841, is fully compensated for by the fourth dispersion-compensating device 844.

Preferably, the second to fourth dispersion-compensating devices for compensating for the dispersions in the individual wavelength bands demultiplexed by the demultiplexer 831 have a module form as being wound like a coil. As a consequence, the space for installation is reduced, and the cost of installation is cut down.

Provided on the first branched transmission line 821 are optical amplifiers 851, 855 which amplify optical signals in S+ band. Provided on the second branched transmission line 822 are optical amplifiers 852, 856 which amplify optical signals in S band. Provided on the third branched transmission line 823 are optical amplifiers 853, 857 which amplify optical signals in C band. Provided on the fourth branched transmission line 824 are optical amplifiers 854, 858 which amplify optical signals in L band. Here, it will be sufficient if an optical amplifier is provided on at least one of the input end side and output end side of each of the first to fourth branched transmission lines 821 to 824. As the optical amplifier, a Raman amplifier such as one disclosed in "Crosstalk Bandwidth in Backward Pumped Fiber Raman Amplifiers" (IEEE PHOTONICS TECHNOLOGY LETTERS, NOVEMBER 1999, VOL. 11, NO. 11, pp. 1417–1449, Jun Shan Wey et al.), for example, can be used.

Here, in the dispersion-compensating system 800 in accordance with this embodiment, the dispersion deviation in a signal wavelength band of 1520 nm to 1620 nm (C and L bands) will be favorable if it is ±0.5 ps/nm/km or less, preferably ±0.2 ps/nm/km or less, more preferably ±0.1 ps/nm/km or less, further preferably ±0.05 ps/nm/km or less, most preferably ±0.025 ps/nm/km or less.

In general, the demand for dispersion becomes severer as the bit rate of optical signals increases. While accumulated dispersion is required to be 1000 ps/nm or less at a signal speed of 10 Gbits/s, it is needed to be 250 ps/nm or less and 63 ps/nm or less when the signal speed rises to 20 Gbits/s and 40 Gbits/s, respectively. Thus, it becomes harder to transmit optical signals as the signal speed rises or the transmission line elongates.

For example, when transmission over a distance of 10000 km required for transpacific communications is taken into consideration by use of optical signals at 10 Gbits/s, accumulated dispersion is required to be 1000 ps/nm or less, whereby dispersion is needed to be 0.1 ps/nm/km or less.

Similarly, when transmission over a distance of 5000 km in view of transatlantic communications is taken into consideration, dispersion is needed to be 0.2 ps/nm/km or less. Further, when transmission over a distance of 2000 km is taken into consideration, dispersion is needed to be 0.5 ps/nm/km or less.

When transmission over a distance of 10000 km is taken into consideration by use of optical signals at 20 Gbits/s, accumulated dispersion is required to be 250 ps/nm or less, whereby dispersion is needed to be 0.025 ps/nm/km or less. When transmission over a distance of 5000 km is taken into consideration, dispersion is needed to be 0.05 ps/nm/km or less.

Therefore, if the dispersion deviation in a signal wavelength band of 1520 nm to 1620 nm (C and L bands) is ±0.5 ps/nm/km or less, then transmission over a distance of 2000 km is possible by use of optical signals at 10 Gbits/s. If the dispersion deviation is ±0.2 ps/nm/km or less, then transmission over a distance of 5000 km is possible by use of optical signals at 10 Gbits/s. If the dispersion deviation is ±0.1 ps/nm/km or less, then transmission over a distance of 10000 km is possible by use of optical signals at 10 Gbits/s. If the dispersion deviation is ±0.05 ps/nm/km or less, then transmission over a distance of 5000 km is possible by use of optical signals at 20 Gbits/s. If the dispersion deviation is ±0.025 ps/nm/km or less, then transmission over a distance of 10000 km is possible by use of optical signals at 20 Gbits/s.

Currently, demands for enhancing the transmission capacity has been increasing, and studies for increasing the transmission speed and broadening the wavelength band in use have been under way in order to respond to these demands. Along therewith, attention has been paid to S band (1490 nm to 1520 nm) and S+ band (1450 nm to 1490 nm) in addition to C band (1520 nm to 1565 nm) and L band (1565 nm to 1620 nm). For enhancing the transmission capacity, it is effective to use all these bands.

Hence, in the dispersion-compensating system 800 in accordance with this embodiment, the dispersion deviation in a signal wavelength band of 1490 nm to 1620 nm including S band in addition to C and L bands will be favorable if it is ±0.5 ps/nm/km or less, preferably ±0.2 ps/nm/km or less, more preferably ±0.1 ps/nm/km or less, most preferably ±0.05 ps/nm/km or less. If the dispersion deviation in the signal wavelength band of 1490 nm to 1620 nm (S, C, and L bands) is ±0.5 ps/nm/km or less, then transmission over a distance of 2000 km is possible by use of optical signals at 10 Gbits/s. If the dispersion deviation is ±0.2 ps/nm/km or less, then transmission over a distance of 5000 km is possible by use of optical signals at 10 Gbits/s. If the dispersion deviation is ±0.1 ps/nm/km or less, then transmission over a distance of 10000 km is possible by use of optical signals at 10 Gbits/s. If the dispersion deviation is ±0.05 ps/nm/km or less, then transmission over a distance of 5000 km is possible by use of optical signals at 20 Gbits/s.

Further, in the dispersion-compensating system 800 in accordance with this embodiment, the dispersion deviation in a signal wavelength band of 1450 nm to 1620 nm including S+ band in addition to C, L, and S bands will be favorable if it is ±0.5 ps/nm/km or less, preferably ±0.2 ps/nm/km or less. If the dispersion deviation in the signal wavelength band of 1450 nm to 1620 nm (S+, S, C, and L bands) is ±0.5 ps/nm/km or less, then transmission over a distance of 2000 km is possible by use of optical signals at 10 Gbits/s. If the dispersion deviation is ±0.2 ps/nm/km or less, then transmission over a distance of 5000 km is possible by use of optical signals at 10 Gbits/s.

Thus, in the dispersion-compensating system 800 in accordance with the eighth embodiment, as for S+ band in the signal wavelength band of 1450 nm to 1620 nm, its dispersion is compensated for by the first dispersion-compensating device 841, whereas its optical signals are amplified by the optical amplifiers 851, 855. As for S band, its dispersion is compensated for by both of the first and second dispersion-compensating devices 841, 842, whereas its optical signals are amplified by the optical amplifiers 852, 856. As for C band, its dispersion is compensated for by both of the first and third dispersion-compensating devices 841, 843, whereas its optical signals are amplified by the optical amplifiers 853, 857. As for L band, its dispersion is compensated for by both of the first and fourth dispersion-compensating devices 841, 844, whereas its optical signals are amplified by the optical amplifiers 854, 858. As a result, over a wide range of signal wavelength bands including S+, S, C, and L bands, the dispersion of optical transmission line can fully be reduced, and optical signals can be amplified. The dispersion-compensating system 800 in accordance with the eighth embodiment is suitably used for a repeater station.

A specific example of the dispersion-compensating system 800 in accordance with the eighth embodiment will now be shown.

Employed as the single-mode optical fiber 1 is one comprising a core made of pure silica and claddings made of silica doped with F element, while having a zero-dispersion wavelength near a wavelength of 1.3 µm. This single-mode optical fiber 1 has, at a wavelength of 1.55 µm, a dispersion of 20.4 ps/nm/km and a dispersion slope of 0.059 ps/nm²/km.

Figure 18A:
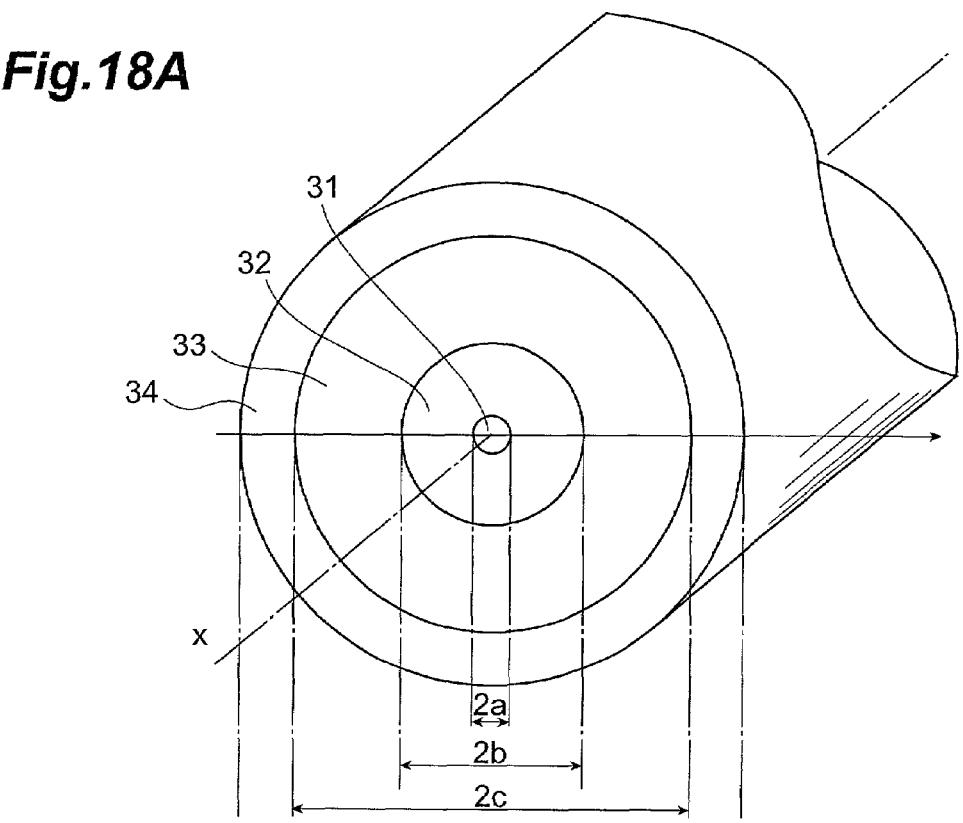
FIG. 18A is a view schematically showing the structure of a dispersion-compensating optical fiber.
Figure 18B:
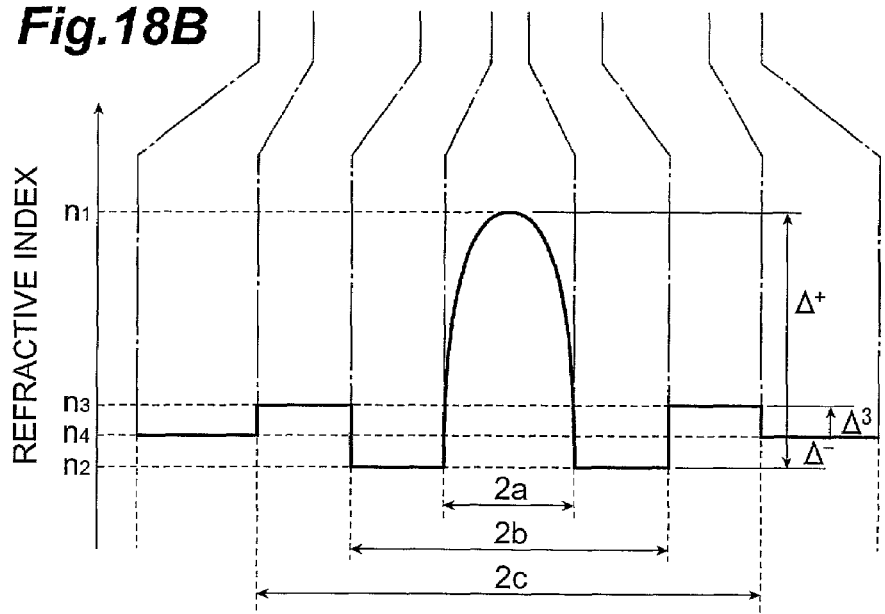
FIG. 18B is a chart showing the refractive index profile of the dispersion-compensating optical fiber.

As the first dispersion-compensating device 841, a dispersion-compensating optical fiber having the refractive index profile shown in FIGS. 18A, 18B is used. In the first dispersion-compensating device (dispersion-compensating optical fiber) 841, a core 31 has a diameter 2a of 4.2 µm, a first cladding 32 has an outside diameter 2b of 7.3 µm, and a second cladding 33 has an outside diameter 2c of 22 µm. The relative refractive index difference $\Delta^+$ of the core 31 with respect to a third cladding 34 is 1.4%, the relative refractive index difference $\Delta^-$ of the first cladding 32 with respect to the third cladding 34 is −0.7%, and the relative refractive index difference $\Delta_3$ of the second cladding 33 with respect to the third cladding 34 is 0.09%. Also, the first dispersion-compensating device 841 has, at a wavelength of 1.55 µm, a dispersion of −64.4 ps/nm/km and a dispersion slope of −0.207 ps/nm²/km.

Employed as the second dispersion-compensating device 842 is a dispersion-shifted optical fiber having a zero-dispersion wavelength of 1502 nm, and a dispersion slope of 0.12 ps/nm²/km at a wavelength of 1.55 µm.

Employed as the third dispersion-compensating device 843 is a dispersion-shifted optical fiber having a zero-dispersion wavelength of 1518 nm, and a dispersion slope of 0.12 ps/nm²/km at a wavelength of 1.55 µm.

Employed as the fourth dispersion-compensating device 844 is a dispersion-shifted optical fiber having a zero-dispersion wavelength of 1530 nm, and a dispersion slope of 0.12 ps/nm²/km at a wavelength of 1.55 µm.

Figure 19:
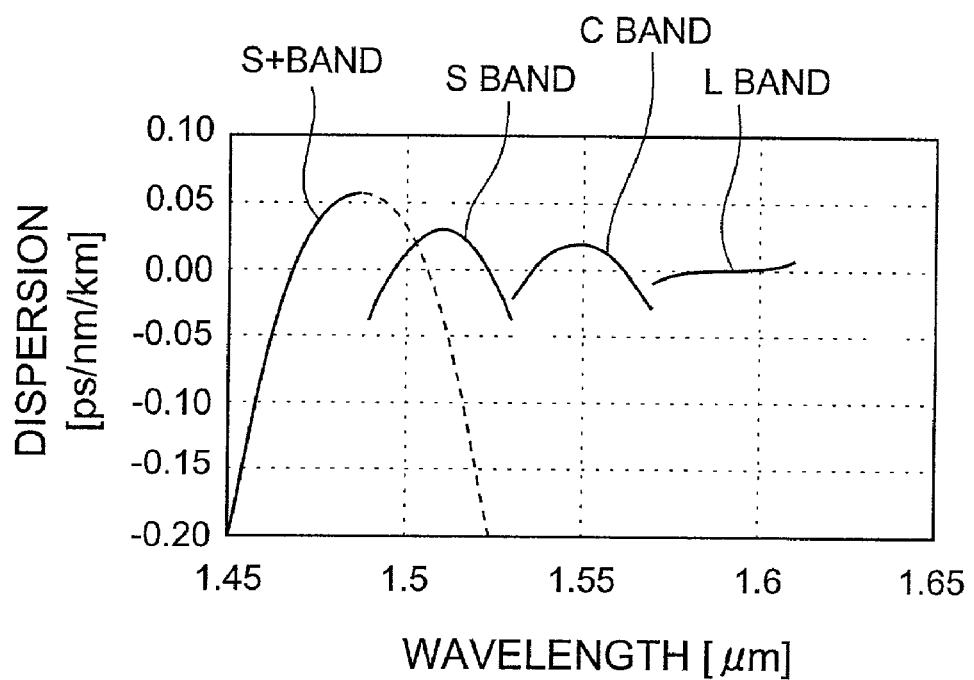
FIG. 19 is a graph showing a specific example of total dispersion characteristics of the dispersion-compensating system in accordance with the eighth embodiment.

FIG. 19 shows total dispersion characteristics in the case where such single-mode optical fiber 1 and first to fourth dispersion-compensating devices (dispersion-compensating optical fibers) 841 to 844 are connected together such that the single-mode optical fiber 1 has a length of 37.6 km, the first dispersion-compensating device 841 has a length of 12.4 km, the second dispersion-compensating device 842 has a length of 3.5 km, the third dispersion-compensating device 843 has a length of 8.8 km, and the fourth dispersion-compensating device 844 has a length of 11.5 km. As can be seen from FIG. 19, dispersion deviation is suppressed to ±0.025 ps/nm/km or less in a signal wavelength band of 1520 nm to 1620 nm (C and L bands).

In a signal wavelength band of 1490 nm to 1620 nm (S, C, and L bands), dispersion deviation is suppressed to ±0.05 ps/nm/km or less.

In a signal wavelength band of 1450 nm to 1620 nm (S+, S, C, and L bands), dispersion deviation is suppressed to ±0.2 ps/nm/km or less.

Without being restricted to the above-mentioned embodiments, the present invention can be modified in various manners. For example, the dispersion-compensating system in accordance with the first or third embodiment may further comprise optical amplifiers for the C band and optical amplifiers for L band as well.

Also, in the dispersion-compensating system in accordance with the eighth embodiment, an additional dispersion-compensating device may be provided on the first branched transmission line (821 in FIG. 17). As a consequence, even when the dispersion in S+ band is not fully compensated for by the first dispersion-compensating device 841, it can further be compensated for by the additional dispersion-compensating device on the first branched transmission line.

The dispersion-compensating system of the present invention can fully reduce dispersion in a wide signal wavelength band. Hence, an optical transmission system employing the dispersion-compensating system of the present invention can carry out optical communications with a large capacity.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dispersion-compensating system for a signal wavelength band of 1520 nm to 1620 nm, said system comprising:
    a first common transmission line through which light in said signal wavelength band propagates;
    first and second branched transmission lines branching off from said first common transmission line;
    a demultiplexer, provided between said first common transmission line and said first and second branched transmission lines, for demultiplexing light in said signal wavelength band propagating through said first common transmission line into first and second wavelength bands, and outputting light in said first wavelength band into said first branched transmission line and light in said second wavelength band into said second branched transmission line;
    a first dispersion-compensating device, provided on said first common transmission line, collectively compensating for a dispersion in said first and second wavelength bands without wavelength demultiplexing; and
    a second dispersion-compensating device, provided on said second branched transmission line, compensating for a dispersion in said second wave-length band,
    wherein said first dispersion-compensating device compensates for the dispersion in said first wavelength band so as to yield a dispersion deviation of +0.5 ps/nm/km or less, and said first and second dispersion-compensating devices compensate for the dispersion in said second wavelength band so as to yield a dispersion deviation of +0.5 ps/nm/km or less.

2. A dispersion-compensating system for a signal wavelength band of 1520 nm to 1620 nm, said system comprising:
    a first common transmission line through which light in said signal wavelength band propagates;
    first and second branched transmission lines branching off from said first common transmission line;
    a demultiplexer, provided between said first common transmission line and said first and second branched transmission lines, for demultiplexing light in said signal wavelength band propagating through said first common transmission line into first and second wavelength bands, and outputting light in said first wavelength band into said first branched transmission line and light in said second wavelength band into said second branched transmission line;
    a first dispersion-compensating device, provided on said first common transmission line, collectively compensating for a dispersion in said first and second wavelength bands without wavelength demultiplexing;
    a second dispersion-compensating device, provided on said second branched transmission line, compensating for a dispersion in said second wave-length band; and
    a third dispersion-compensating device provided on said first branched transmission line, said first and third dispersion-compensating devices compensating for the dispersion in said first wavelength band,
    wherein said first and third dispersion-compensating devices compensate for the dispersion in said first wavelength band so as to yield a dispersion deviation of +0.5 ps/nm/km or less, and said first and second dispersion-compensating devices compensate for the dispersion in said second wavelength band so as to yield a dispersion deviation of +0.5 ps/nm/km or less.

3. A dispersion-compensating system for a signal wavelength band of 1520 nm to 1620 nm, said system comprising:
    a first common transmission line through which light in said signal wavelength band propagates;
    first and second branched transmission lines branching off from said first common transmission line;
    a demultiplexer, provided between said first common transmission line and said first and second branched transmission lines, for demultiplexing light in said signal wavelength band propagating through said first common transmission line into first and second wavelength bands, and outputting light in said first wavelength band into said first branched transmission line and light in said second wavelength band into said second branched transmission line;
    a first dispersion-compensating device, provided on said first common transmission line, collectively compensating for a dispersion in said first and second wavelength bands without wavelength demultiplexing; and
    a second dispersion-compensating device, provided on said second branched transmission line, compensating for a dispersion in said second wave-length band,
    wherein said first dispersion compensating device has a dispersion slope compensating ratio of 60 to 150% at the wavelength of 1.55 µm.

4. A dispersion-compensating system for a signal wavelength band of 1520 nm to 1620 nm, said system comprising:
    a first common transmission line through which light in said signal wavelength band propagates;
    first and second branched transmission lines branching off from said first common transmission line;
    a demultiplexer, provided between said first common transmission line and said first and second branched transmission lines, for demultiplexing light in said signal wavelength band propagating through said first common transmission line into first and second wavelength bands, and outputting light in said first wavelength band into said first branched transmission line and light in said second wavelength band into said second branched transmission line;

a first dispersion-compensating device, provided on said first branched transmission line, for compensating for a dispersion in said first wavelength band; and a second dispersion-compensating device, provided on said second branched transmission line, for compensating for a dispersion in said second wavelength band, wherein each of said first and second dispersion-compensating devices compensates for a dispersion in a wavelength band having a band width not less than 45 nm.

5. A dispersion-compensating system according to claim 4, wherein said first dispersion-compensating device compensates for the dispersion in said first wavelength band so as to yield a dispersion deviation of +0.5 ps/nm/km or less, and said second dispersion-compensating device compensates for the dispersion in said second wavelength band so as to yield a dispersion deviation of +0.5 ps/nm/km or less.

6. A dispersion-compensating system according to claim 4, further comprising a multiplexer for multiplexing light in said first wavelength band propagating through said first branched transmission line and light in said second wavelength band propagating through said second branched transmission line.

7. A dispersion-compensating system according to claim 4, further comprising:

a first optical amplifier, provided on said first branched transmission line, for amplifying light in said first wavelength band; and a second optical amplifier, provided on said second branched transmission line, for amplifying light in said second wavelength band.

8. A dispersion-compensating system according to claim 7, wherein said first and second optical amplifiers include a Raman amplifier.

9. A dispersion-compensating system demultiplexing an optical signal inputted by way of a common transmission line into a plurality of wavelength bands and comprising a plurality of dispersion-compensating devices for compensating for respective dispersions in thus demultiplexed wavelength bands, wherein each of said plurality of dispersion-compensating devices compensates for a dispersion in a wavelength band having a band width not less than 30 nm.

10. A dispersion-compensating system according to claim 9, wherein the number of wavelength bands to be demultiplexed is at least 2 but not greater than 5.

11. A dispersion-compensating system according to claim 9, wherein the wavelength bands to be demultiplexed are S+, S, C, and L bands.

12. A dispersion-compensating system according to claim 9, having a dispersion deviation of +0.5 ps/nm/km or less in a signal wavelength band of 1520 nm to 1620 nm.

13. A dispersion-compensating system according to claim 12, wherein said dispersion deviation is +0.2 ps/nm/km or less.

14. A dispersion-compensating system according to claim 12, wherein said dispersion deviation is +0.1 ps/nm/km or less.

15. A dispersion-compensating system according to claim 12, wherein said dispersion deviation is +0.05 ps/nm/km or less.

16. A dispersion-compensating system according to claim 12, wherein said dispersion deviation is +0.025 ps/nm/km or less.

17. A dispersion-compensating system according to claim 9, having a dispersion deviation of +0.5 ps/nm/km or less in a signal wavelength band of 1490 nm to 1620 nm.

18. A dispersion-compensating system according to claim 17, wherein said dispersion deviation is +0.2 ps/nm/km or less.

19. A dispersion-compensating system according to claim 17, wherein said dispersion deviation is +0.1 ps/nm/km or less.

20. A dispersion-compensating system according to claim 17, wherein said dispersion deviation is +0.05 ps/nm/km or less.

21. A dispersion-compensating system according to claim 9, having a dispersion deviation of +0.5 ps/nm/km or less in a signal wavelength band of 1450 nm to 1620 nm.

22. A dispersion-compensating system according to claim 21, wherein said dispersion deviation is +0.2 ps/nm/km or less.

23. A dispersion-compensating system according to claim 9, wherein said dispersion-compensating de-vices for compensating for the respective dispersions in demultiplexed wavelength bands have a module form.

* * * * *